US007326115B2

(12) United States Patent
Baerlocher

(10) Patent No.: US 7,326,115 B2
(45) Date of Patent: Feb. 5, 2008

(54) GAMING DEVICE AND METHOD HAVING A FIRST INTERACTIVE GAME WHICH DETERMINES A FUNCTION OF A SECOND WAGERING GAME

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 43 days.

(21) Appl. No.: 11/207,659

(22) Filed: Aug. 18, 2005

(65) Prior Publication Data

US 2006/0040735 A1 Feb. 23, 2006

Related U.S. Application Data

(60) Provisional application No. 60/603,490, filed on Aug. 20, 2004.

(51) Int. Cl.
*A63F 13/00* (2006.01)

(52) U.S. Cl. .................... 463/25; 463/1; 463/7; 463/9; 463/16

(58) Field of Classification Search .................... 463/1, 463/6-9, 16-20, 42
See application file for complete search history.

(56) References Cited

U.S. PATENT DOCUMENTS 3,853,324 A 12/1974 Reiner et al.
3,877,700 A 4/1975 Moe
3,923,305 A 12/1975 Reiner et al.
4,012,046 A 3/1977 Liket
4,129,304 A 12/1978 Mager
4,198,052 A 4/1980 Gauselmann
4,363,485 A 12/1982 Edwall
4,448,419 A 5/1984 Telnaes
4,550,916 A 11/1985 Oritz
4,582,324 A 4/1986 Koza et al.

(Continued)

FOREIGN PATENT DOCUMENTS

EP 375190 A2 6/1990

(Continued)

OTHER PUBLICATIONS

Cyclone advertisements, by Innovative Concepts in Entertainment, Inc., published prior to Sep. 13, 2002.

(Continued)

*Primary Examiner*—Scott E. Jones
(74) *Attorney, Agent, or Firm*—Bell, Boyd & Lloyd LLP

(57) ABSTRACT

A gaming device including a first player interactive game requiring one or more player inputs which result in an outcome. The outcome does not result in an award provided to the player. In one embodiment, the gaming device determines a paytable employed in the wagering game based on an outcome of the interactive game. In another embodiment, the gaming device includes a plurality of different wagering games. The gaming device determines which wagering game to provide to the player based, at least in part, on the outcome of the interactive game. Other suitable functions can be employed in the wagering game based on the outcome of the interactive game in accordance with the present invention. In any embodiment, the gaming device provides an outcome to the player for the wagering game which can result in an award.

36 Claims, 25 Drawing Sheets

U.S. PATENT DOCUMENTS

| | | | |
|---|---|---|---|
| 4,586,707 | A | 5/1986 | McNeight et al. |
| 4,593,904 | A | 6/1986 | Graves |
| 4,615,527 | A | 10/1986 | Moss |
| 4,618,150 | A | 10/1986 | Kimura |
| 4,624,459 | A | 11/1986 | Kaufman |
| 4,652,998 | A | 3/1987 | Koza et al. |
| 4,666,160 | A | 5/1987 | Hamilton |
| 4,695,053 | A | 9/1987 | Vazquez, Jr. et al. |
| 4,756,532 | A | 7/1988 | Kamille |
| 4,773,647 | A | 9/1988 | Okada et al. |
| 4,781,377 | A | 11/1988 | McVean et al. |
| 4,805,907 | A | 2/1989 | Hagiwara |
| 4,926,327 | A | 5/1990 | Sidley |
| 4,936,588 | A | 6/1990 | Rader et al. |
| 4,948,133 | A | 8/1990 | Helm et al. |
| 4,964,642 | A | 10/1990 | Kamille |
| 5,001,632 | A | 3/1991 | Hall-Tipping |
| 5,083,271 | A | 1/1992 | Thacher et al. |
| 5,083,800 | A | 1/1992 | Lockton |
| 5,114,155 | A | 5/1992 | Tillery et al. |
| 5,116,055 | A | 5/1992 | Tracy |
| 5,205,555 | A | 4/1993 | Humano |
| 5,280,909 | A | 1/1994 | Tracy |
| 5,299,810 | A | 4/1994 | Pierce et al. |
| 5,308,065 | A | 5/1994 | Bridgeman et al. |
| 5,340,317 | A | 8/1994 | Freeman |
| 5,342,047 | A | 8/1994 | Heidel et al. |
| 5,342,049 | A | 8/1994 | Wichinsky et al. |
| 5,342,058 | A | 8/1994 | Giovannetti |
| 5,344,144 | A | 9/1994 | Cannon |
| 5,393,061 | A | 2/1995 | Manship et al. |
| 5,397,125 | A | 3/1995 | Adams |
| 5,409,225 | A | 4/1995 | Kelly et al. |
| 5,411,268 | A | 5/1995 | Nelson et al. |
| 5,411,271 | A | 5/1995 | Mirando |
| 5,429,361 | A | 7/1995 | Raven et al. |
| 5,449,173 | A | 9/1995 | Thomas et al. |
| 5,531,440 | A | 7/1996 | Babrowski et al. |
| 5,536,016 | A | 7/1996 | Thompson |
| 5,542,669 | A | 8/1996 | Charron et al. |
| 5,544,892 | A | 8/1996 | Breeding |
| 5,560,603 | A | 10/1996 | Seelig et al. |
| 5,593,349 | A | 1/1997 | Miguel et al. |
| 5,611,535 | A | 3/1997 | Tiberio |
| 5,611,730 | A | 3/1997 | Weiss |
| 5,618,045 | A | 4/1997 | Kagan et al. |
| 5,628,684 | A | 5/1997 | Bouedec |
| 5,643,088 | A | 7/1997 | Vaughn et al. |
| 5,645,281 | A | 7/1997 | Hesse et al. |
| 5,645,486 | A | 7/1997 | Nagao et al. |
| 5,647,798 | A | 7/1997 | Falciglia |
| 5,667,217 | A | 9/1997 | Kelly et al. |
| 5,676,371 | A | 10/1997 | Kelly et al. |
| 5,697,611 | A | 12/1997 | Kelly et al. |
| 5,700,007 | A | 12/1997 | Kelly et al. |
| 5,700,008 | A | 12/1997 | Lawlor et al. |
| 5,704,612 | A | 1/1998 | Kelly et al. |
| 5,707,285 | A | 1/1998 | Place et al. |
| 5,722,891 | A | 3/1998 | Inoue |
| 5,733,193 | A | 3/1998 | Allard et al. |
| 5,743,523 | A | 4/1998 | Kelly et al. |
| 5,743,532 | A | 4/1998 | Lafferty |
| 5,755,621 | A | 5/1998 | Marks et al. |
| 5,766,074 | A | 6/1998 | Cannon et al. |
| 5,769,424 | A | 6/1998 | Kelly et al. |
| 5,769,716 | A | 6/1998 | Saffari et al. |
| 5,772,509 | A | 6/1998 | Weiss |
| 5,779,544 | A | 7/1998 | Seelig et al. |
| 5,779,549 | A | 7/1998 | Walker et al. |
| 5,788,573 | A | 8/1998 | Baerlocher et al. |
| 5,803,451 | A | 9/1998 | Kelly et al. |
| 5,803,914 | A | 9/1998 | Ryals et al. |
| 5,810,354 | A | 9/1998 | Banyai |
| 5,816,918 | A | 10/1998 | Kelly et al. |
| 5,823,874 | A | 10/1998 | Adams |
| 5,833,536 | A | 11/1998 | Davids et al. |
| 5,836,586 | A | 11/1998 | Marks et al. |
| 5,848,932 | A | 12/1998 | Adams |
| 5,851,148 | A | 12/1998 | Brune et al. |
| 5,855,514 | A | 1/1999 | Kamille |
| 5,860,648 | A | 1/1999 | Petermeier et al. |
| 5,871,398 | A | 2/1999 | Schneier et al. |
| 5,873,781 | A | 2/1999 | Keane |
| 5,882,258 | A | 3/1999 | Kelly et al. |
| 5,882,261 | A | 3/1999 | Adams |
| 5,888,115 | A | 3/1999 | Shoemaker, Jr. et al. |
| 5,902,184 | A | 5/1999 | Bennett et al. |
| 5,910,046 | A | 6/1999 | Wada et al. |
| 5,911,418 | A | 6/1999 | Adams |
| 5,919,088 | A | 7/1999 | Weiss |
| 5,941,770 | A | 8/1999 | Miers et al. |
| 5,951,397 | A | 9/1999 | Dickinson |
| 5,967,514 | A | 10/1999 | Kelly et al. |
| 5,988,643 | A | 11/1999 | Awada |
| 5,993,315 | A | 11/1999 | Strider et al. |
| 5,997,401 | A | 12/1999 | Crawford |
| 6,004,207 | A | 12/1999 | Wilson, Jr. et al. |
| 6,007,426 | A | 12/1999 | Kelly et al. |
| 6,012,722 | A | 1/2000 | Petermeier et al. |
| 6,015,344 | A | 1/2000 | Kelly et al. |
| 6,015,346 | A | 1/2000 | Bennett |
| 6,019,369 | A | 2/2000 | Nakagawa et al. |
| 6,019,374 | A | 2/2000 | Breeding |
| 6,033,307 | A | 3/2000 | Vancura |
| 6,047,963 | A | 4/2000 | Pierce et al. |
| 6,048,271 | A | 4/2000 | Barcelou |
| 6,050,895 | A | 4/2000 | Luciano, Jr. et al. |
| 6,056,642 | A | 5/2000 | Bennett |
| 6,062,981 | A | 5/2000 | Luciano, Jr. et al. |
| 6,071,192 | A | 6/2000 | Weiss |
| 6,089,976 | A | 7/2000 | Schneider et al. |
| 6,089,977 | A | 7/2000 | Bennett |
| 6,102,400 | A | 8/2000 | Scott et al. |
| 6,102,402 | A | 8/2000 | Scott et al. |
| 6,102,798 | A | 8/2000 | Bennett |
| 6,110,039 | A | 8/2000 | Oh |
| 6,110,041 | A | 8/2000 | Walker et al. |
| 6,110,043 | A | 8/2000 | Olsen |
| 6,117,007 | A | 9/2000 | Matsuyama et al. |
| 6,117,008 | A | 9/2000 | Machiguchi |
| 6,120,031 | A | 9/2000 | Adams |
| 6,126,541 | A | 10/2000 | Fuchs |
| 6,126,542 | A | 10/2000 | Fier |
| 6,126,547 | A | 10/2000 | Ishimoto |
| 6,135,453 | A | 10/2000 | Srichayaporn |
| 6,135,884 | A | 10/2000 | Hedrick et al. |
| 6,135,885 | A | 10/2000 | Lermsiaux |
| 6,139,013 | A | 10/2000 | Pierce et al. |
| 6,142,873 | A | 11/2000 | Weiss et al. |
| 6,142,874 | A | 11/2000 | Kodachi et al. |
| 6,146,273 | A | 11/2000 | Olsen |
| 6,149,156 | A | 11/2000 | Feola |
| 6,159,095 | A | 12/2000 | Frohm et al. |
| 6,159,097 | A | 12/2000 | Gura |
| 6,159,098 | A | 12/2000 | Slomiany et al. |
| 6,165,070 | A | 12/2000 | Nolte et al. |
| 6,173,955 | B1 | 1/2001 | Perrie et al. |
| 6,174,235 | B1 | 1/2001 | Walker et al. |
| 6,174,237 | B1 | 1/2001 | Stephenson |
| 6,190,255 | B1 | 2/2001 | Thomas et al. |
| 6,193,606 | B1 | 2/2001 | Walker et al. |
| 6,210,279 | B1 | 4/2001 | Dickinson |
| 6,220,593 | B1 | 4/2001 | Pierce et al. |
| 6,220,961 | B1 | 4/2001 | Keane et al. |

| | | | |
|---|---|---|---|
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,288 | B1 | 5/2001 | Walker et al. |
| 6,251,013 | B1 | 6/2001 | Bennett |
| 6,261,177 | B1 | 7/2001 | Bennett |
| 6,267,669 | B1 | 7/2001 | Luciano, Jr. et al. |
| 6,270,409 | B1 | 8/2001 | Shuster |
| 6,270,411 | B1 | 8/2001 | Gura et al. |
| 6,279,910 | B1 | 8/2001 | De Keller |
| 6,287,194 | B1 | 9/2001 | Okada et al. |
| 6,290,600 | B1 | 9/2001 | Glasson |
| 6,290,603 | B1 | 9/2001 | Luciano, Jr. |
| 6,293,866 | B1 | 9/2001 | Walker et al. |
| 6,302,790 | B1 | 10/2001 | Brossard |
| 6,309,298 | B1 | 10/2001 | Gerou |
| 6,309,299 | B1 | 10/2001 | Weiss |
| 6,309,300 | B1 | 10/2001 | Glavich |
| 6,312,334 | B1 | 11/2001 | Yoseloff |
| 6,315,660 | B1 | 11/2001 | Demar et al. |
| 6,322,309 | B1 | 11/2001 | Thomas et al. |
| 6,328,649 | B1 | 12/2001 | Randall et al. |
| 6,346,043 | B1 | 2/2002 | Colin et al. |
| 6,347,996 | B1 | 2/2002 | Gilmore et al. |
| 6,364,765 | B1 | 4/2002 | Walker et al. |
| 6,364,766 | B1 | 4/2002 | Anderson et al. |
| 6,364,768 | B1 | 4/2002 | Acres et al. |
| 6,375,187 | B1 | 4/2002 | Baerlocher |
| 6,379,245 | B2 | 4/2002 | De Keller |
| 6,386,974 | B1 | 5/2002 | Adams |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,435,511 | B1 | 8/2002 | Vancura et al. |
| 6,443,837 | B1 | 9/2002 | Jaffe et al. |
| 6,454,651 | B1 | 9/2002 | Yoseloff |
| 6,467,771 | B1 | 10/2002 | Robb |
| 6,488,580 | B1 | 12/2002 | Robb |
| 6,506,118 | B1 | 1/2003 | Baerlocher et al. |
| 6,522,312 | B2 | 2/2003 | Ohshima et al. |
| 6,537,150 | B1 | 3/2003 | Luciano et al. |
| 6,554,704 | B2 | 4/2003 | Nicastro et al. |
| 6,569,015 | B1 | 5/2003 | Baerlocher et al. |
| 6,572,473 | B1 | 6/2003 | Baerlocher |
| 6,582,306 | B1 | 6/2003 | Kaminkow |
| 6,599,193 | B2 | 7/2003 | Baerlocher et al. |
| 6,602,137 | B2 | 8/2003 | Kaminkow et al. |
| 6,605,002 | B2 | 8/2003 | Baerlocher |
| 6,607,438 | B2 | 8/2003 | Baerlocher et al. |
| 6,632,140 | B2 | 10/2003 | Berman et al. |
| 6,632,141 | B2 | 10/2003 | Webb et al. |
| 6,648,754 | B2 | 11/2003 | Baerlocher et al. |
| 6,656,040 | B1 | 12/2003 | Brosnan et al. |
| 6,692,003 | B2 | 2/2004 | Potter et al. |
| 6,722,976 | B2 | 4/2004 | Adams |
| 6,733,386 | B2 | 5/2004 | Cuddy et al. |
| 6,761,632 | B2 | 7/2004 | Basenmer et al. |
| 6,767,284 | B1 | 7/2004 | Koza |
| 6,769,983 | B2 | 8/2004 | Slomiany |
| 6,780,103 | B2 | 8/2004 | Bansemer et al. |
| 6,780,111 | B2 | 8/2004 | Cannon et al. |
| 6,786,824 | B2 | 9/2004 | Cannon |
| 6,811,482 | B2 | 11/2004 | Letovsky |
| 6,817,948 | B2 | 11/2004 | Pascal et al. |
| 6,832,959 | B2 | 12/2004 | Baerlocher |
| 6,837,793 | B2 | 1/2005 | McClintic |
| 6,852,027 | B2 | 2/2005 | Kaminkow et al. |
| 6,863,606 | B1 | 3/2005 | Berg et al. |
| 6,923,720 | B2 | 8/2005 | Loose |
| 6,942,568 | B2 | 9/2005 | Baerlocher |
| 7,156,735 | B2 | 1/2007 | Brosnan et al. |
| 7,192,334 | B2 | 3/2007 | Baerlocher |
| 2002/0049084 | A1 | 4/2002 | Hugh-Baird et al. |
| 2002/0059252 | A1 | 5/2002 | Yamaguchi |
| 2002/0107065 | A1 | 8/2002 | Rowe |
| 2002/0128055 | A1 | 9/2002 | Adams |
| 2002/0151342 | A1 | 10/2002 | Tracy et al. |
| 2002/0160825 | A1 | 10/2002 | Nicastro et al. |
| 2003/0013519 | A1 | 1/2003 | Bennett |
| 2003/0064773 | A1 | 4/2003 | Baerlocher et al. |
| 2003/0104854 | A1 | 6/2003 | Cannon |
| 2003/0104860 | A1 | 6/2003 | Cannon et al. |
| 2003/0114209 | A1 | 6/2003 | Ritner, Jr. et al. |
| 2003/0114218 | A1 | 6/2003 | McClintic |
| 2003/0114219 | A1 | 6/2003 | McClintic |
| 2003/0114220 | A1 | 6/2003 | McClintic |
| 2003/0119576 | A1 | 6/2003 | McClintic et al. |
| 2003/0119581 | A1 | 6/2003 | Cannon et al. |
| 2003/0125102 | A1 | 7/2003 | Cannon |
| 2003/0125107 | A1 | 7/2003 | Cannon |
| 2003/0171144 | A1 | 9/2003 | Letovsky |
| 2004/0048659 | A1 | 3/2004 | Seelig et al. |
| 2004/0106446 | A1 | 6/2004 | Cannon et al. |
| 2004/0116173 | A1 | 6/2004 | Baerlocher |
| 2004/0116174 | A1 | 6/2004 | Baerlocher et al. |
| 2004/0198490 | A1 | 10/2004 | Bansemer et al. |
| 2004/0204226 | A1 | 10/2004 | Foster et al. |
| 2005/0020340 | A1 | 1/2005 | Cannon |
| 2005/0026664 | A1 | 2/2005 | Bansemer et al. |
| 2005/0181853 | A1 | 8/2005 | Baerlocher |
| 2006/0247012 | A1 | 11/2006 | Walker et al. |
| 2007/0099688 | A1 | 5/2007 | Brosnan et al. |

FOREIGN PATENT DOCUMENTS

| | | |
|---|---|---|
| EP | 1 624 421 | 2/2007 |
| GB | 1 242 298 | 8/1971 |
| GB | 2 072 395 | 2/1981 |
| GB | 2 066 991 | 7/1981 |
| GB | 2 097 160 | 12/1981 |
| GB | 2 100 905 | 1/1983 |
| GB | 2 180 682 | 4/1987 |
| GB | 2 182 186 | 5/1987 |
| GB | 2 191 030 | 12/1987 |
| GB | 2 207 268 | 1/1989 |
| GB | 2 226 436 | 6/1990 |
| GB | 2 242 300 | 9/1991 |
| GB | 2 258 164 | 2/1993 |
| GB | 2 262 642 | 6/1993 |
| NZ | 508626 | 11/2001 |
| WO | WO 96/25725 | 8/1996 |
| WO | WO 98/00210 | 1/1998 |
| WO | WO 98/51384 | 11/1998 |

OTHER PUBLICATIONS

Description of Poker written by Hoyle's Rules of Games published 1946-1983.

Diamond Dash web page http://www.arcadeplanet.com/images/diamond_dash.jpg written by Arcade Planet, Inc., printed on Mar. 31, 2004.

The Inside Straight article written by IGT, published in 2002.

Introducing The Hottest Video Games on the Nile written by Aristocrat Technologies, published Oct. 2000.

Jackpot Party brochure and article published by WMS Gaming Inc. in 1998.

Joes's Yard Games advertisement published by IGT in 2003.

Joe's Yard Games Video Slots advertisement published by IGT in 2004.

Mikohn Ripley's Believe It or Not article written by Strictly Slots, published in Jun. 2001.

Mountain Coin Machine Distributing—Redemption Games—Cyclone™ from www.mountaincoin.com printed Feb. 28, 2002.
Press Your Luck article by Strictly Slots, dated 2000.
Primetime Amusements Redemption Games advertisement, printed from http://www.primetimeamusements.com/redemption.htm on Feb. 28, 2002.
Table Games advertisement brochure, published by ShuffleMaster in 2000.
Slots 2003 article written by Melissa Raimondi, published by Strictly Slots in Jan. 2003.
Tickets'n'Tunes from www.rgb.com printed on Feb. 28, 2002.
Weiner Distributing ICE Cyclone™ from www.winerd.com. printed on Feb. 28, 2002.
Fey, Slot Machines, A Pictorial History of the First 100 Years, Liberty Belle Books, 1983, pp. 215, 219.
Frog Wild Article, written by Strictly Slots, published in Nov. 2001.

FIG. 3D

70

PAYTABLE A

| | |
|---|---|
| 3 CHERRIES | 5 |
| 3 BARS | 10 |
| 3 BELLS | 85 |
| 3 7'S | 600 |

Average expected award = 175

FIG. 3E

72

PAYTABLE B

| | |
|---|---|
| 3 CHERRIES | 25 |
| 3 BARS | 125 |
| 3 BELLS | 225 |
| 3 7'S | 325 |

Average expected award = 175

FIG. 3F

74

PAYTABLE C

| | |
|---|---|
| 3 CHERRIES | 165 |
| 3 BARS | 170 |
| 3 BELLS | 180 |
| 3 7'S | 185 |

Average expected award = 175

FIG. 4E

120

| First Game Outcome | Second Game |
|---|---|
| First Place | Slot |
| Second Place | Video Poker |
| Third Place | Blackjack |
| Fourth Place | Keno |

FIG. 5

150

| | Wager | Interactive Game Pool (10%) | Winning Paytable Outcomes (80%) | House Hold (10%) |
|---|---|---|---|---|
| Player 1 | $2 | $0.20 | $1.60 | $0.20 |
| Player 2 | $2 | $0.20 | $1.60 | $0.20 |
| Player 3 | $2 | $0.20 | $1.60 | $0.20 |
| Total | $6 | $0.60 | $4.80 | $0.60 |

FIG. 6

160

| | Wager | Interactive Game Pool (10%) | Winning Paytable Outcomes (80%) | House Hold (10%) |
|---|---|---|---|---|
| Player 1 | $2 | $0.20 | $1.60 | $0.20 |
| Player 2 | $2 | $0.20 | $1.60 | $0.20 |
| Player 3 | $2 | $0.20 | $1.60 | $0.20 |
| Player 4 | $2 | $0.20 | $1.60 | $0.20 |
| Player 5 | $2 | $0.20 | $1.60 | $0.20 |
| Total | $10 | $1 | $8 | $1 |

GAMING DEVICE AND METHOD HAVING A FIRST INTERACTIVE GAME WHICH DETERMINES A FUNCTION OF A SECOND WAGERING GAME

PRIORITY CLAIM

This application is a non-provisional application of, claims priority to and the benefit of U.S. Provisional Patent Application No. 60/603,490, filed on Aug. 20, 2004, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to gaming devices and method, and more particularly to a gaming device and method which includes a first interactive skill, partial skill, or pseudo skill game requiring one or more player inputs which yield or result in one or more outcomes. The outcome (s) from the first interactive game determines a function such as a paytable employed in a second wagering game on which the player makes a wager and in which the player can obtain an award.

Primary wagering games of gaming machines in most jurisdictions are games of luck, not games of skill. For instance, in slot machines, the player must make a wager on the slot game to begin the slot game, and the gaming machine randomly determines the outcome for the slot game. The outcome may be a winning outcome or a losing outcome. The outcome determines whether the player obtains an award according to the paytable of the slot machine. The paytables and winning combinations of the slot machine are predetermined or fixed.

One reason slot machines are popular, is because an amateur, novice or inexperienced player can play most slot machines at the player's own pace, with no required skills, strategy or risk evaluation and perform as well as a seasoned or experienced slot game player. Most slot machines are set to pay back on average between 80 and 99 percent of the amounts that the players wager. In most modern slot machines, a processor controlling the gaming machine randomly determines the outcomes and thus the awards. In other slot machines, a central server determines the awards and sends the awards to a plurality of gaming machines. The central server determines such awards from a pool of potential awards, where each award of the pool must be eventually provided to a player. The central server picks each award randomly from the pool.

Certain wagering gaming machines such as video poker and blackjack involve certain player strategy or decision-making. The player decides which cards to hold in draw-type poker games and whether to take additional cards in blackjack-type card games. These games generally require a certain level of strategy to be successful.

Other known games are bonus games triggered in a primary wagering game such as double-up poker-type and offer and acceptance-type bonus or secondary games which require a player to risk an award won to potentially achieve a higher award. These games also can generally be said to require a certain level of strategy to be successful.

Certain other bonus or secondary games triggered in a primary wagering game also employ skill, apparent skill or pseudo skill. For instance, U.S. Pat. No. 6,761,632 discloses skill, apparent skill, and pseudo skill-type bonus games. In these bonus games, the awards are generally randomly determined. The player's participation in the skill, apparent skill or pseudo skill event may, for instance, determine the timing of when the player gets the awards. In another example, U.S. Pat. No. 6,572,473 discloses a game where the player skill can determine which set or pool of awards will be used to determine the award provided to the player in the game. The processor of the gaming machine randomly determines the award from the determined set or pool of awards to provide to the player.

Wagering games of gaming devices in certain jurisdictions are required to involve a skill event such as an event requiring player dexterity to be successful. These games cannot turn purely upon a random outcome. These gaming machines require strategy or timing of inputs by the player to determine chance of success and failure. If the player does not play optimally, the actual payout percentage of the gaming machine will decrease accordingly.

Primary wagering games which are purely skill games or partial skill games present certain problems for game designers and gaming establishments. First, skill games can be mastered by players having a high level of skill, substantial practice or both. To combat the mastering of such games and to make the economics work, a game designer may have to make the skill game relatively difficult. The difficulty level may be too great for inexperienced or average players to have a sufficient level of success and enjoyment at the gaming machines. Such players may not have a good gaming experience and may not repeat play on the gaming machines.

Skill games, on the other hand, are generally interactive and are enjoyable for certain people to play. Many people have especially grown accustomed to and comfortable with playing arcade skill games, home video skill games, computer skill games, handheld device skill games, and data network (e.g., internet) skill games. Some of these people may not want to play games of conventional gaming machines which are purely based on randomly generated outcomes and involve no skill or little skill. Some of these people also enjoy the competitive nature of skill games which are not provided by known conventional wagering games of gaming machines.

Accordingly, a need exists for a gaming machine and method including a player interactive component and a wagering component that can be readily played in a casino or a gaming environment. A need also exists for a gaming machine and for a method of controlling payouts in a gaming machine having a skill component so the gaming machine does not provide a disadvantage or a significant disadvantage to inexperienced or average players and which also limits prohibitive high payouts to those who master the skill component.

SUMMARY OF THE INVENTION

One embodiment of the present invention provides a gaming machine or gaming device having a first interactive game requiring one or more player inputs. The player inputs result in one or more outcomes. The outcomes do not result in a monetary or other valuable award provided to the player.

Rather, a second wagering game is always provided to the player where the player can obtain or has a chance to obtain a monetary or other valuable award. In one embodiment, the gaming device selects or determines one of a plurality of different functions such as paytables to employ in the wagering game based on the outcome of the first interactive game. The gaming device provides the wagering game to the player and randomly determines an outcome for the wagering game. The outcome in the wagering game can result in a monetary or other valuable award provided to the player based on the selected paytable and the player's wager on the wagering game. The outcome in the wagering game can also or alternatively result in a triggering or an activation of one or more bonus games which provide a monetary or other valuable award to the player. Thus, the present invention contemplates that after a player makes a wager on a wagering game, a first interactive game is played by the player to determine a function of the wagering game where the player may win a monetary award.

In another embodiment, the gaming device includes a plurality of different wagering games. The gaming device determines which of the different wagering games to provide to the player based, at least in part, on the player's outcome of the interactive game. The different wagering games may be of the same type such as different slot games or variations of the same slot game, or maybe of different types such as slot, poker, blackjack, keno, checkers, or bunco. The wagering games may all employ the same paytable or may employ different paytables. Alternatively, one of the wagering games, a plurality of the wagering games, or each wagering game may have multiple different paytables. In one embodiment, the employed paytable may also be based on the outcome in the interactive game.

It should thus be understood that any suitable function of the wagering game can be employed based on the outcomes of the interactive game in accordance with the present invention. For instance, the number of wagering games provided to the player may be based on one or more of the outcomes in the first interactive game. In other embodiments, the gaming device includes one or more of the modifiers such as a multiplier employed in the wagering game or to determine an award in the wagering game. The modifiers may be based on the one or more of the outcomes in the first interactive game. In further embodiments, the number of paylines employed, wager per payline, the number or function of wild symbols or other suitable symbols in the wagering game may be based on one or more of the outcomes in the first interactive game. In another embodiment, the outcome of the first interactive game may make the player eligible to receive a jackpot or a progressive award.

The first interactive game can be any suitable interactive skill game, interactive partial skill game or interactive pseudo skill game. In one embodiment, the skill game may include any suitable type and any suitable number of skill events, such as hand-eye coordination events or dexterity events. For example, the interactive game is any suitable type of racing or competitive game, a sports-based game or a shooting game. In another embodiment, the first interactive game involves mental skill, knowledge, logical deduction or strategy. For example, the first interactive game may be a trivia game or a memory game. The first interactive game is a non-wagering game. That is, a wager is not applied to the first interactive game. The gaming device does not provide an award for the outcome obtained in the first interactive game based on the wager. That is, the player does not have any chance of obtaining any type of award or prize in the interactive game. The first game may alternatively be referred to herein as the interactive game, the interactive skill game, the skill game, the preliminary game, the introductory game, the opening game, the arcade game, the non-wagering game, the non-awarding game, or the functional game.

In one alternative embodiment, the gaming device may additionally provide an achieved token or bonus award to the player based on the outcome in the first interactive game. In one such embodiment, in the first interactive game, the gaming machine provides such award to a designated place finisher, such as the first place finisher. In another such embodiment, the gaming device provides such award to the player if the player achieves a designated level or threshold in the first interactive game such as obtaining the highest score.

In one preferred embodiment of the present invention, the first interactive game is a conventional arcade game. In this embodiment, the gaming device of the present invention includes an arcade game which is physically similar in appearance and function to a conventional arcade game or arcade machine. The gaming device includes additional inputs of a conventional slot or other wagering gaming machine such as player bet or wager inputs, player tracking card input(s), monetary acceptors, and cash out buttons. The gaming device includes additional outputs such as ticket or money dispensers and one or more additional displays for the wagering game or any bonus game associated with the wagering game. Alternatively, the display that displays the arcade-type game may be used to display the wagering game or one or more bonus games associated with the wagering game. It should be appreciated that these gaming machines which include arcade-type interactive games and slot-type wagering games may be placed in any suitable location in a casino or a gaming establishment. One suitable location is adjacent to a sports book area in a casino. Other locations can be in separate gaming rooms dedicated to the gaming machines of the present invention.

In a first embodiment, a player plays the first interactive game against the gaming machine or device to achieve an outcome in the interactive game. In a second embodiment, the gaming machine is part of a gaming system which includes one or more other linked gaming machines. In the second embodiment, in the first interactive game, a player at one gaming machine competes against one or more players at one or more of the other linked gaming machines in the interactive game to achieve an outcome in the interactive game. In these embodiments, the individual outcome for each player in the interactive game can be based on a place or a rank obtained by that player, such as a first place finish or second place finish in the interactive game such as a racing game. In other embodiments, the individual outcome for each player in the interactive game is based on an accumulated number of points obtained by that player, such as a number of targets hit by that player in a shooting game or a number of questions answered correctly by the player in a trivia game. It should thus be appreciated that in the multi-gaming machine embodiment, each participating player will receive an outcome based on that player's performance in the first interactive game which can be but does not have to be in all embodiments relative to the other players' performance in the first interactive game. For example, only one player can obtain first place and one player can obtain last place in one embodiment, but in another embodiment, more than one player can obtain the same outcome such as shooting all of the targets.

It should thus be appreciated in the single gaming machine embodiment, the interactive game outcome is determined based on how the player performs in a skill event in the interactive game wherein the player is playing by himself or herself or playing against the gaming device. In the multi-gaming machine embodiment, the interactive game outcome is determined based on how the player performs in a skill event in the interactive game wherein the player is playing by himself or herself or playing against one or more gaming machines controlled competitors (i.e., a multiple player gaming system where the player is the only competitor) or wherein the player is playing against one or more players or competitors at other linked gaming machines.

In one example embodiment, the interactive game is a racing game in which a player can achieve first place, second place or third place or achieves a rank. In the various embodiments, the player obtains the place or rank by just racing alone in the interactive game to achieve a time, racing against one or more gaming machine controlled competitors, or racing against one or more competitors or players at one or more other linked gaming machines. It should thus be appreciated the outcome of the first player interactive game may be determined in any such suitable manner.

In one embodiment, the gaming device includes a wagering game which includes a plurality of different potential functions or characteristics. The gaming device determines which of the different functions or characteristics will be employed in the wagering game played by a player based on the outcome achieved by that player in the interactive game. In one embodiment, the wagering game is a suitable known primary wagering game which is operable to provide one or more awards to a player, such as, but not limited to, slot, poker, keno, bingo, craps, blackjack, bunco or any combination thereof. The wagering game may be any suitable wagering-type game developed in the future which is operable upon a wager by a player and which is operable to provide an award to the player. The function or characteristic determined by the interactive game outcome may be any suitable function or characteristic. For example, the gaming device uses the interactive game outcome to determine: (i) the paytable employed in the wagering game; (ii) the volatility of the wagering game; (iii) the average expected payback percentage in the wagering game; (iv) the eligibility for an award, bonus award or a bonus game in the wagering game; (v) the triggering event for one or more bonus games in the wagering game; (vi) the eligibility for a progressive award in the wagering games; (vii) the wager of the wagering game; (viii) the modifier in the wagering game (ix) the type or kind of the wagering game; or (xi) any combination of these.

In another embodiment, as mentioned above, the gaming device or gaming system includes a plurality of wagering games. The gaming device determines which wagering game to provide to the player based on the interactive game outcome. In the single player embodiment, the gaming device provides the player the wagering game associated with the outcome achieved by that player in the interactive game. In the multi-player embodiment, the gaming system provides each player of the interactive game a wagering game associated with the individual outcome achieved by that player in that player's play of the interactive game. It should be appreciated that each of the players may be provided different wagering games. The gaming device provides a player an outcome in the wagering game, which can result in a monetary award. In one alternative embodiment, a player may select which wagering game to play from a plurality of wagering games. In this alternative embodiment, the player's outcome in the interactive game determines which wagering games are available for selection. For instance, the first place winner in the interactive game may have first selection from a plurality of different wagering games. The other players may pick from the remaining wagering games. In another alternative of this embodiment, the interactive game outcome determines the number of choices the player has to select from for the wagering game. For example, the first place winner is provided ten games to select from for the wagering game. The second place winner has eight choices to select from for the wagering game.

The present invention contemplates in one embodiment that each different wagering game will have an equal or substantially equal average expected payback percentage even though the wagering games are different, have different paytables, different volatilities, different size payouts or awards, different numbers of winning combinations, and/or different hit frequencies. This means that the skill event of the interactive game does not determine the outcome in the wagering game because each different wagering game has an equal or substantially equal average expected payback percentage. That is, regardless of the outcome in the skill game, each player has the same overall chances of winning. The present invention may thus provide a perceived advantage to the players who do better in the first interactive game but does not provide an actual advantage on average. In the embodiment, where the volatilities are different, the player who does best in the first interactive game has a chance to receive a higher award.

The present invention may typically take a player longer to play than a game of a conventional slot or other type wagering gaming machine because the player must first play the first interactive game and then play the wagering game. In certain multiple linked gaming device embodiments, players may also wait a limited time, such as a couple of seconds, for other players to join in the next play of the interactive game, as described in more detail below. Casinos or gaming establishments will want to maintain profitability even though the gaming device(s) of the present invention may take longer to play. It should be appreciated that the gaming device and gaming system of the present invention may be funded in multiple ways which account for these possible extended play time periods. In one embodiment, the gaming device requires a higher average minimum bet on the wagering game than a similar conventional gaming machine. In one embodiment, the amount of the money or monetary units required to activate the wagering game of the gaming machine is a set amount, such as $5.00. In another embodiment, the amount of money or monetary units required to activate the wagering game of the gaming machine is a variable amount or in a range, such as $1.00 to $25.00. In one embodiment, when the amount of money required to activate the wagering game of the gaming machine is a variable amount, the amounts of the wager are proportional to the size of the potential payouts or awards.

In another embodiment, the amount wagered also determines an aspect, function or characteristic of either or both of the first interactive game or the second wagering game. For instance, the amount of the wager may determine the length of the first interactive game. A larger wager can result in a longer game play of the first interactive game. The amount wagered can alternatively or additionally determine a function of the wagering game such as a respective portion of the paytable as in conventional gaming machines, the ability to reach a bonus round in the wagering game, or any other suitable feature or function in the wagering game.

It should also be appreciated that in one embodiment, the wagering game for each of the players of the multi-player embodiment may be the same game and have the same game result for each player but that each player may receive a different award based on the same game result. In one embodiment, the interactive game determines a different paytable for the wagering game for different players. For example, the players each play the interactive game and achieve a game result or place in the interactive game which determines their respective paytables. The wagering game, such as a slot game, is the same game for each player. The slot game is initiated on either individual display devices or on one large or common display device. The gaming system generates the same symbols in the slot game for each player. However, the paytables of the players may have different winning combinations or different awards for the same combinations or both. The players have the opportunity of achieving different awards from the same wagering game result.

In one embodiment, the gaming device enables a player to enter a wager for the wagering game in a conventional wagering format. When the player completes the wager for the wagering game, the gaming device then switches to or begins the first interactive game either automatically or upon an input from the player. The gaming device enables the player to play the interactive game and provides and displays the outcome of the interactive game to the player. The gaming device determines the wagering game (including the applicable functions of the wagering game) to provide the player based on the interactive game outcome and displays the wagering game and then the wagering game outcome. If the wagering game outcome is a winning outcome, the gaming device provides an award associated with that winning outcome to the player based in part on the wager and on the paytable of the wagering game.

It should thus be appreciated that the present invention provides a gaming device including an interactive game and a wagering game. In one embodiment, the wagering game is always provided to the player regardless of the outcome of the interactive game. The interactive game does not provide an award to the player and the wagering game can result in an award provided to the player. Thus, the player always has a chance of obtaining an award in the wagering game regardless of the interactive game outcome. In one embodiment, the wagering game has the same or substantially the same expected average payout or return to the player regardless of the interactive game outcome. This allows the inexperienced, average and experienced players to have the same average payout, thus no player is disadvantaged or advantaged by the skill event of the present invention.

One advantage that one embodiment of the present invention provides is that the player may obtain a paytable that has a higher award than other paytables for the wagering game if the player achieves a designated outcome in the interactive game such as first place. The higher award can be a conventional award with a higher value than any of the other awards. The higher award can be a jackpot award, a progressive award, a physical prize such as a new automobile, or any other suitable award. The present invention thus rewards the players which achieve the better outcomes in the first interactive games by providing the player a chance or a better chance to receive a higher or a better award in the wagering game while maintaining that each player will have the same or substantially the same average expected payout or return from the wagering game and thus from the gaming machine of the present invention.

In another embodiment of the present invention, the gaming system includes multiple linked gaming machines and only a designated number of players, such as one player, the top two players, or the top three players get to play the wagering game. The other players achieve losing outcomes and do not get to play the wagering game. In one embodiment, each player has a probability of being provided the wagering game based on how that player did in the interactive game or based on the outcome in the interactive game. The players who did better in the interactive game have greater chances of playing the wagering game. For example, the first place winner may have a 40% chance of being awarded or playing the wagering game, the second place winner may have a 30% change of being awarded or playing the wagering game, the third place winner may have a 20% chance of being awarded or playing the wagering game, and the fourth place winner may have a 10% chance of being awarded or playing the wagering game. This award system can be configured in any suitable manner. In one such embodiment, consolation awards could be provided to players who are not awarded or do not play the wagering game. This award can be based on the player's wagers made on the wagering games. The random determination of this embodiment can be displayed to the player. For instance, a number from 1 to 10 is drawn. The first place player is assigned the numbers 1 to 4, the second place player is assigned the numbers 5 to 7, the third place player is assigned the numbers 8 to 9 and the fourth place player is assigned the number 10. It should be appreciated that any other suitable methods for determining which player or players play the wagering game may be used by the present invention.

In another embodiment, the gaming system includes a plurality of gaming machines. The gaming machines or gaming system include a first interactive game and a second wagering game. To participate in the games, the players are required to wager a certain amount or level. In one embodiment, portions of the wager are allocated to or fund different pools or paytables. A certain amount or percentage of the wager is allocated for an interactive game pool, a second amount of the wager is allocated for a paytable including the house hold.

More specifically, in one embodiment, a player is required to wager a certain amount, such as $2 to initiate one of the gaming machines of this gaming system. The gaming machine or gaming system allocates a certain amount or certain percentage of the wager for different pools or paytables. In one embodiment, the gaming system allocates 10% of the wager for the interactive game pool, 80% of the wager for the payouts of the paytable and 10% of the wager for the house hold. That is, on average, $0.20 of the wager funds an interactive game pool for the winner of the interactive game, $1.60 of the wager funds the winning outcomes of payouts of the paytable for the wagering game; and $0.20 of the wager funds the house hold, casino or company running the game. In one example of this embodiment, 100% of the interactive game pool is awarded to the winner of that game. This prize pool may be an actual pool or an average expected value pool. Thus, in one embodiment the greater the wager and/or the more players there are per game, the higher the interactive game pool is and in this embodiment, the larger the prize is for the winner.

In one embodiment, a gaming system includes a plurality of gaming machines and a plurality of different interactive game outcomes for an interactive game. The interactive game outcomes include an interactive game designated outcome. A controller is operable with the gaming machines to enable one or more players to each place a wager and fund an interactive game pool with a portion of the placed wagers and enable the players who placed wagers to play an interactive game. The controller is operable with the gaming machines to determine and display interactive game outcomes for the play of the interactive game, wherein the interactive game designated outcome is obtained by one of the players who placed the wagers. The controller is operable with the gaming machines to provide the player who obtained the interactive game designated outcome an interactive game award based on the interactive game pool. For each player who places the wager, the controller is operable with the gaming machines to display at least one wagering game to the player, determine a wagering game outcome for said wagering game, and provide any awards to the player associated with any winning outcomes obtained in said wagering game.

In another embodiment, more than one player receives an award for the interactive game. In one example of this embodiment, if the interactive game pool reaches a threshold amount, more than one player receives an award or prize. For example, if the interactive game pool reaches $75, then the players that finish in first, second and third place each receive an award. In another embodiment, if there are a certain number of players playing the interactive game, more than one player receives an award for the interactive game. For example, if there are more than 20 players playing the interactive game, four of the players receive an award for the interactive game. In another embodiment, if both a certain number of players are playing the interactive game and the interactive game pool reaches a certain level or threshold, the gaming system awards more than one player an award. In another embodiment, the gaming system awards one of the players of the interactive game one or more awards. In another embodiment, the gaming system awards more than one player an award. It should be appreciated that the gaming system may award one or more awards to one or more players of the interactive game in any suitable manner.

In another embodiment, the gaming machine or system requires the player to place a side wager for the interactive game pool. In one embodiment, the gaming system or gaming machine enables the player to place one wager for the interactive game and a separate wager for the wagering game or place a wager and designate a certain amount for the interactive game and a certain amount of the wager for the wagering game. In one embodiment, to play the games, the player is only required to wager on the wagering game. That is, the side wager for the interactive game is optional. In any of these wager allocation embodiments, the gaming system or device may require a minimum bet to qualify to win some or all of the interactive game pool.

In another embodiment, the gaming system or gaming machine provides an award to one or more players of the interactive game based on designated time intervals. In one embodiment, each player of a gaming machine or a player of a data network has a player tracking card or another suitable type a player identifier. If that player has the highest outcome or point accumulation for the interactive game in a designated period of time, the gaming system or device provides that player of the game an award for being the winner for that time interval. For example, every half-hour the gaming system determines which player won the most points for that half-hour and provides the winner a notification on the player card to pick up the award or provides the data network player a message that they won the award and awards the player the funds electronically.

In another embodiment, the gaming system includes a plurality of game rounds and each game round includes an interactive game and a wagering game. In one example of this embodiment, for each round the gaming system provides the interactive game to a player and the wagering game to the player. The gaming machine then provides a next round of the wagering game. In one embodiment, a wager is required for each round of the game. In one embodiment, the player opts-in to the next round of the game by placing an input to continue the game. The input may be to place a wager or insert more money or tokens for the next round. It should be appreciated that this game may also be provided in an opt-out format. That is, the gaming machine continues to the next round unless the player makes an input to quit the game. In one embodiment, in the last round the wagering game has a higher paytable or an increased award than the other rounds. Including an additional feature in the last wagering round of the game encourages players to participate in all rounds of the game.

It is therefore an advantage of the present invention to provide a wagering gaming device that employs skill.

Another advantage of the present invention is to provide a wagering gaming device that combines a first interactive game and a second wagering game where the player's skill in the interactive game does not change the expected average payout in the wagering game.

Another advantage of the present invention is to provide a wagering gaming device that displays a first interactive game and a second wagering game on the same or different displays.

Another advantage of the present invention is to provide a first player interactive game which results in an outcome that determines the wagering game.

Another advantage of the present invention is to provide a first player interactive game which results in an outcome that determines the paytable of a wagering game.

Another advantage of the present invention is to provide a first player interactive game which results in an outcome that determines the volatility of a wagering game.

Additional features and advantages of the present invention are described in, and will be apparent from, the following Detailed Description of the Invention and the figures.

BRIEF DESCRIPTION OF THE FIGURES

FIGS. 3D, 3E and 3F are examples of different paytables which can be employed in or for a wagering game.

FIG. 4E is a front elevation view of a table of examples of different wagering games associated with different outcomes of interactive game.

FIG. 5 is a table of examples of the wager allocations to different award pools.

FIG. 6 is a table of examples of the wager allocations to different award pools.

DETAILED DESCRIPTION OF THE INVENTION

Gaming Device and Electronics

Figure 1:
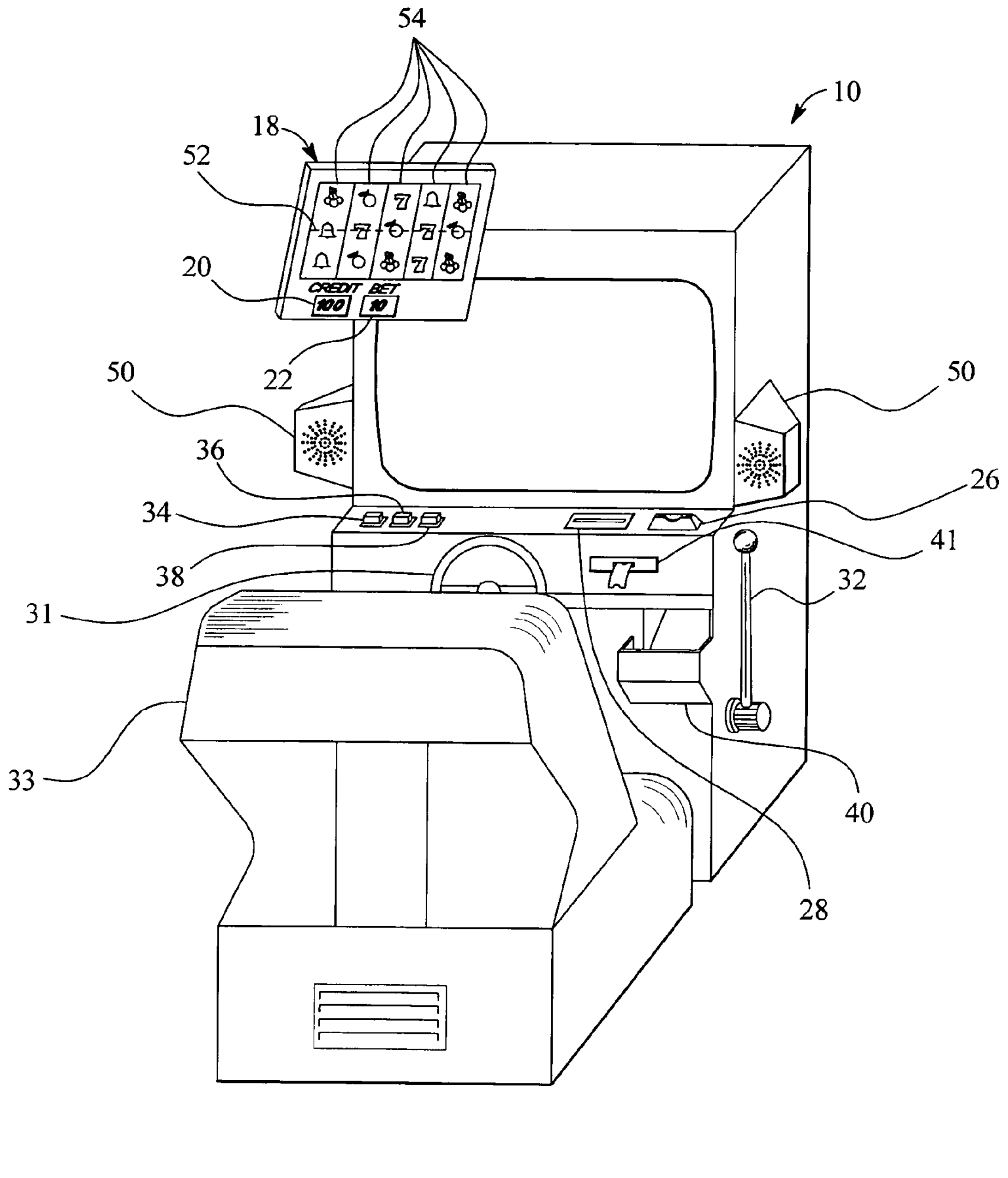
FIG. 1 is a front perspective view of one embodiment of the gaming device of the present invention which includes a first interactive arcade-type driving game and a second slot-type game.

Referring now to the drawings, one embodiment of the gaming device or gaming machine 10 of the present invention is illustrated in FIG. 1. The gaming device 10 has a support structure, housing or cabinet 11 which supports a plurality of displays such the interactive game display 16 and the wagering game display 18. The cabinet supports a plurality of inputs such as a coin slot 26, a bill acceptor 28, a wheel 31, one or more pedals (not shown), a pull arm 32, a play button 34, a bet one button 36, a repeat the bet button (not shown), a bet max button (not shown), and a cash out button 38. The cabinet additionally supports a plurality of outputs such as a ticket dispenser 41 and any other suitable features of a conventional arcade machine and a conventional slot machine or other wagering gaming machine. The illustrated gaming device 10 also includes a seat or chair 33. However, the gaming device could alternatively be configured so that a player can operate it while standing. It should be appreciated that the gaming device of the present invention may include any other suitable player input devices such as a joystick, a rollerball, a touchpad, a gun, a button or a touch screen.

In the illustrated embodiment, the first player interactive game is displayed on the lower display 16 and the wagering game is displayed on the upper display 18. The display devices are preferably connected to or mounted to the cabinet 11 of the gaming device. In another embodiment, the gaming device includes only one display. It should be appreciated that the gaming device may be configured in any suitable manner to enable a player to play any type of suitable game requiring player interaction and any type of wagering game.

Electronics

Figure 2A:
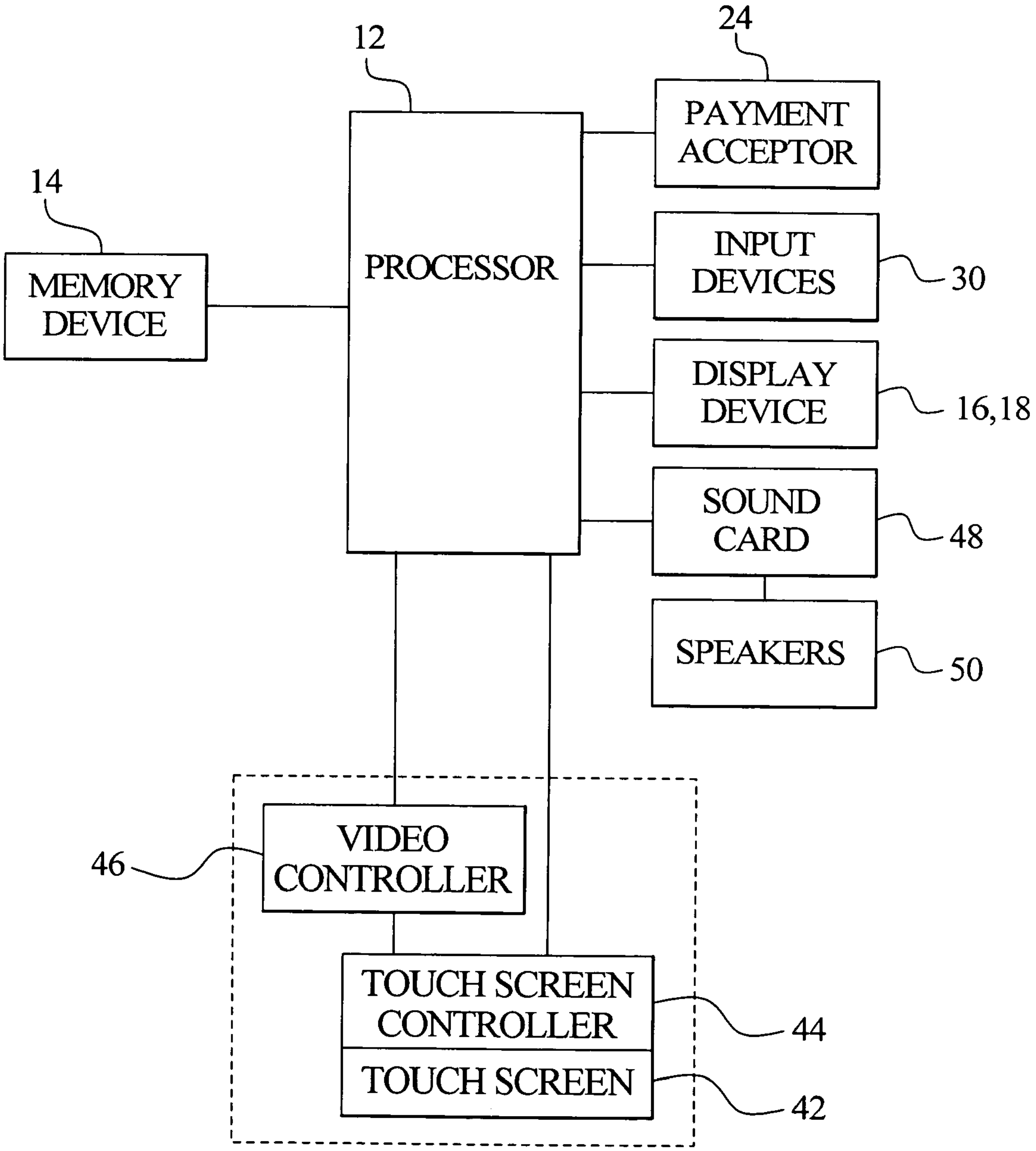
FIG. 2A is a schematic block diagram of the electronic configuration of one embodiment of the gaming device of the present invention.

In one embodiment, as illustrated in FIG. 2A, the gaming device includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The gaming machine may include one or more processors including one or more separate processors for the interactive game and one or more for the wagering game. Such dual processors would communicate to control the sequence of play of such game. The memory device also stores other data such as image data, event data, player input data, random or pseudo-random number generators, paytable data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such as a removable memory device in a desktop, a laptop personal computer, a personal digital assistant (PDA) or other computerized platform. The processor and memory device may be collectively referred to herein as a "computer" or "controller."

Structure

In one embodiment, as illustrated in FIG. 2A, the gaming device includes one or more display devices controlled by the processor. FIG. 1 includes a lower display device 16 and an upper display device 18. The lower 16 and upper 18 display devices may display the first player interactive game, any suitable wagering game associated with the interactive game and/or information relating to the interactive game or wagering game. It should be appreciated that the gaming device may include any suitable number of display devices. In one embodiment, the gaming device includes one display device operable to display the interactive game and the wagering game. As seen in FIG. 1, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle elongated rectangle.

In one alternative embodiment, the symbols, images and indicia displayed on or more of the display device may be in mechanical form. That is, the display device(s) may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIG. 1, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

In one embodiment, the gaming device includes at least one and preferably a plurality of input devices in communication with the processor. The input devices can include any suitable device which enables the player to produce an input signal which is read by the processor. In one embodiment, after appropriate wagering on the wagering game of the gaming device, the player uses an input device that is a game activation device such as a pull arm or a play button to start the interactive game. The play button can be any suitable play activator. In one embodiment the play button is a bet one button, a max bet button or a repeat the bet button. In one embodiment, upon appropriate wagering, the gaming device begins the interactive game play automatically or goes into active mode. In another embodiment, upon the player engaging one of the play buttons, the gaming device automatically activates game play.

In one embodiment, as shown in FIG. 1, one input device is a bet one button 36. The player places a bet by pushing the bet one button to wager on the wagering game. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager on the wagering game permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips from a ticket dispenser 41 redeemable by a cashier or funding to the player's electronically recordable identification card.

In one embodiment, the gaming device includes at least one input device for player interaction in the interactive game. The input device may be any suitable input device used in an arcade-type gaming machine, such as a joystick, touchpad, mouse, rollerball, laser gun, pedals, wheel or keyboard to enable suitable player interaction in the interactive game.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the first interactive game or wagering game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the interactive game and/or wagering game as a game image, symbol or indicia.

In one embodiment, as discussed in more detail below, the gaming device randomly generates outcomes and thus awards for the wagering game based on probability data. That is, each outcome is associated with a probability and the gaming device generates the outcome to be provided to the player in the wagering game based on the associated probabilities. In this embodiment, since the gaming device generates outcomes randomly or based upon a probability calculation, there is no certainty that the gaming device will ever provide the player with any specific award or other game outcome in the wagering game.

In another embodiment, as discussed in more detail below, the gaming device employs a predetermined or finite set or pool of awards (including awards of zero or loser) for the wagering game. In this embodiment, as each award is provided to the player for the wagering game, the gaming device removes the provided award from the predetermined set or pool. Once removed from the set or pool, the specific provided award cannot be provided to the player again. This type of gaming device provides players with all of the available awards over the course of the play cycle and guarantees the amount of actual wins and losses.

Wagering Game

The gaming device of the present invention includes at least one wagering game. The wagering game may be any suitable game, such as, but not limited to, slots, poker, bunco, checkers, blackjack, roulette, keno, bingo, craps and any combination of these or any other suitable random game which results in awards. In one embodiment, the gaming device determines which wagering game to provide to the player based, at least in part, on the outcome of the interactive game.

In one embodiment, the wagering game is a slot game with one or more paylines 52 on the upper display 18, as illustrated in FIG. 1. The paylines may be horizontal, vertical, circular, diagonal, angled or any combination thereof. In one embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In one embodiment, if the reels 54 are in video form, the plurality of simulated video reels 54 are displayed on one or more of the display devices as described above. Each reel 54 displays a plurality of indicia or symbols such as bells, hearts, fruits, numbers, letters, bars or other images which preferably correspond to a theme associated with the gaming device.

In one embodiment, the wagering game is a poker game wherein the gaming device enables the player to play a conventional game of video poker and initially deals five cards all face up from a virtual deck of fifty-two cards. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the wagering game is a multi-hand version of video draw poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

Bonus Games

In addition to winning an award in the wagering game, the gaming device may also give players the opportunity to win awards in at least one bonus game or bonus round. In one embodiment, the gaming device provides the player one or more bonus games after a triggering event in the wagering game.

The bonus game enables the player to obtain a prize or payout in addition to the prize or payout, if any, obtained from the wagering game. In one embodiment, the bonus game may be any type of suitable game, either similar to or completely different from the wagering game. In one embodiment, the gaming device includes a program which will automatically begin a bonus game after the player has achieved a triggering event or qualifying condition in the wagering game. In another embodiment, the triggering event or qualifying condition may be defined or determined by exceeding a certain amount of game play (number of games, number of credits, amount of time, place, number of points), reaching a specified number of points earned during game play or as a random award.

In one embodiment, after a player has qualified for a bonus game, the player may subsequently enhance his/her bonus game participation through continued play of the wagering game. Thus, for each bonus qualifying event, such as a bonus symbol, that the player obtains, a given number of bonus game wagering points or credits may be accumulated in a "bonus meter" programmed to accrue the bonus credits or entries toward eventual participation in a bonus game. The occurrence of multiple such bonus qualifying events in the wagering game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; the player must win or earn entry through play of the wagering game and, thus, play of the wagering game is encouraged. In another embodiment, qualification of the bonus or wagering game could be accomplished through a simple "buy in" by the player if, for example, the player has been unsuccessful at qualifying through other specified activities.

Data Network Play

Figure 2B:
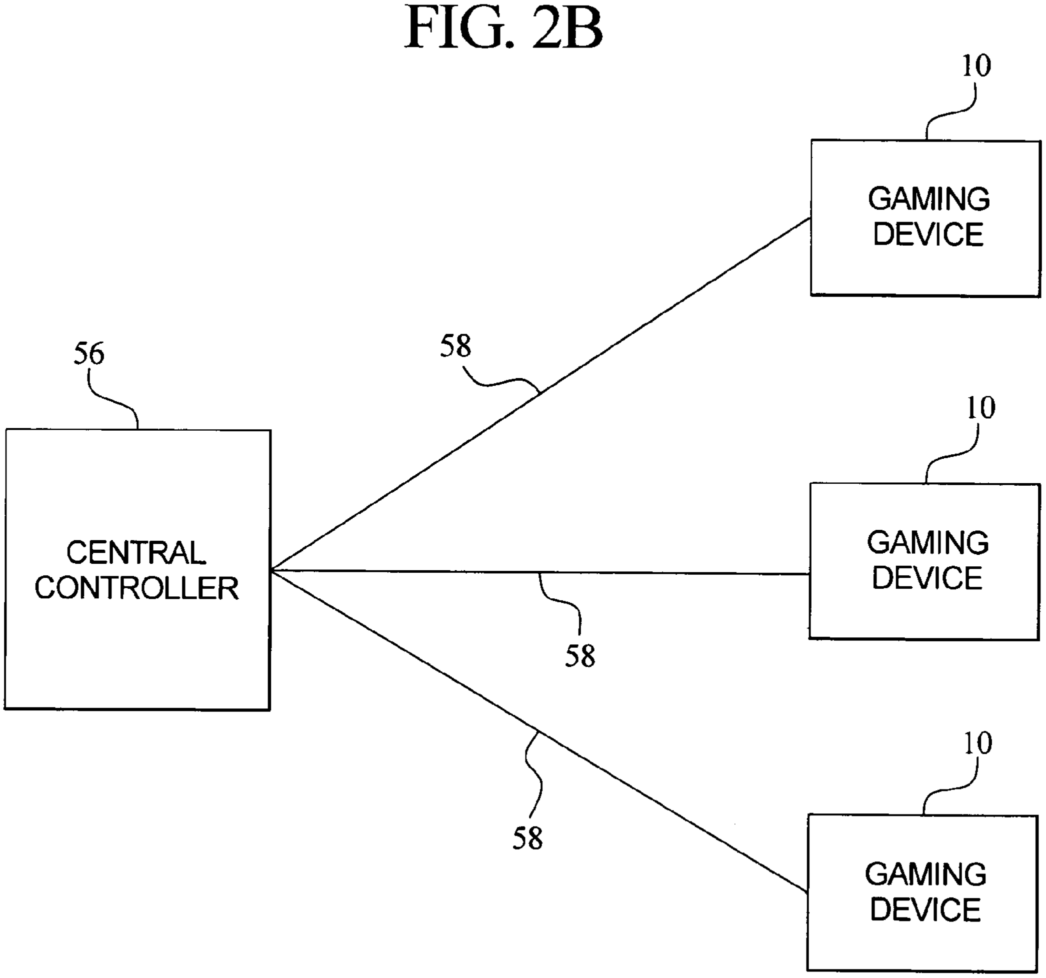
FIG. 2B is a schematic block diagram illustrating a plurality of gaming terminals in communication with a central controller.

In one embodiment, as illustrated in FIG. 2B, one or more of the gaming devices 10 of the present invention may be linked or connected to each other through a data network or a remote communication link 58 with some or all of the functions of each gaming device provided at a central location such as a central server or central controller 56. More specifically, the processor(s) of each gaming device may be designed to facilitate transmission of signals between the individual gaming device and the central server or controller. This embodiment enables the players of the different gaming machines to compete against each other in the interactive game of the present invention.

In one embodiment, the wagering game award provided to the player is determined by a central server or controller and provided to the player at the gaming device of the present invention. In this embodiment, each of a plurality of such gaming devices is in communication with the central server or controller. Upon a player initiating game play at one of the gaming devices, the initiated gaming device communicates a wagering game award request to the central server or controller.

In one embodiment, the central server or controller receives the game award request and randomly generates a game award for the wagering game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game awards (including awards of zero which are losing outcomes). In this embodiment, the central server or controller receives the game award request and independently selects a predetermined game award from a set or pool of game awards. The central server or controller flags or marks the selected game award as used. Once a game award is flagged as used, it is prevented from further selection from the set or pool and cannot be selected by the central controller or server upon another wager. The provided game award can include a wagering game award, a bonus game award or a series of game awards such as one or more free games.

The central server or controller communicates the generated or selected game award to the initiated gaming device. The gaming device receives the generated or selected game award and provides the game award to the player as the wagering game award. In an alternative embodiment, how the generated or selected game award is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

It should also be appreciated that the server will communicate data to each individual gaming device which provides the gaming devices the outcome of the first interactive game such that the gaming devices have the data on the outcome to provide the appropriate wagering games to the player. It should also be appreciated that the interactive game and wagering game can be controlled by separate processors which communicate directly or communicate through another processor or server. Such configuration can be employed to simplify the design protocols and reduce security risks.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager on the wagering game may be allocated to bonus event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

It should be appreciated that the central server may also keep track or maintain additional information regarding play of the gaming machines in the group, such as one or more conventional progressive awards associated with the gaming machines which are provided to the players in a conventional manner. Moreover, the central server may track other information, such as when (or if) a bonus event is played by a gaming machine which has been selected to provide the bonus event.

It should be appreciated that if the wagering game or wagering game processor is in control of the money or wager processing including wager inputs and payout, such processor can communicate such information to the central server or controller. The central server or controller can pool the data from all of the gaming machines to determine the number of players, how long the interactive game will last, and any other suitable game functions or features.

First Interactive Game Determines Function of Wagering Game or the Wagering Game Provided to a Player One embodiment of the present invention provides a first interactive game involving skill, partial skill or pseudo skill requiring one or more player inputs. The player inputs result in an outcome. The outcome does not result in a monetary or other valuable award provided to the player. Rather, a wagering game is always provided to the player. In one embodiment, the gaming device selects or determines one of a plurality of different functions such as paytables to employ in the wagering game based on the outcome of the interactive game. The gaming device provides the wagering game to the player and randomly determines an outcome for the wagering game based on the selected function or paytable and the players wager on the wagering game. The outcome in the wagering game can be a losing outcome which does not result in an award provided to the player or a winning outcome which results in a monetary or other valuable award provided to the player. The outcome in the wagering game can also or alternatively result in a triggering or an activation of one or more bonus games which provide a monetary or other valuable award to the player. In one embodiment, the average expected payout of each paytable is equal or substantially equal.

In another embodiment, the gaming device or gaming system includes a plurality of wagering games. The interactive game outcome determines which wagering game to provide to the player. In the single player embodiment, the gaming device provides the player the wagering game associated with the outcome achieved in the interactive game. In the multi-player embodiment, the gaming system provides each player one of the wagering games associated with the individual outcome achieved by that player in that player's play of the interactive game. It should be appreciated that two or more or each of the players may be provided different wagering games. The gaming device provides a player an outcome in the wagering game which can result in an award based on the paytable of that wagering game. In one embodiment, the average expected payout of each wagering game is equal or substantially equal.

FIGS. 1, 3A, 3B, 3C, 3D, 3E, 3F and 3G illustrate one embodiment of the gaming device which includes a first interactive racing game. The gaming device uses the outcome of the racing game to determine which paytable to employ in a second subsequently played slot game.

Figure 3A:
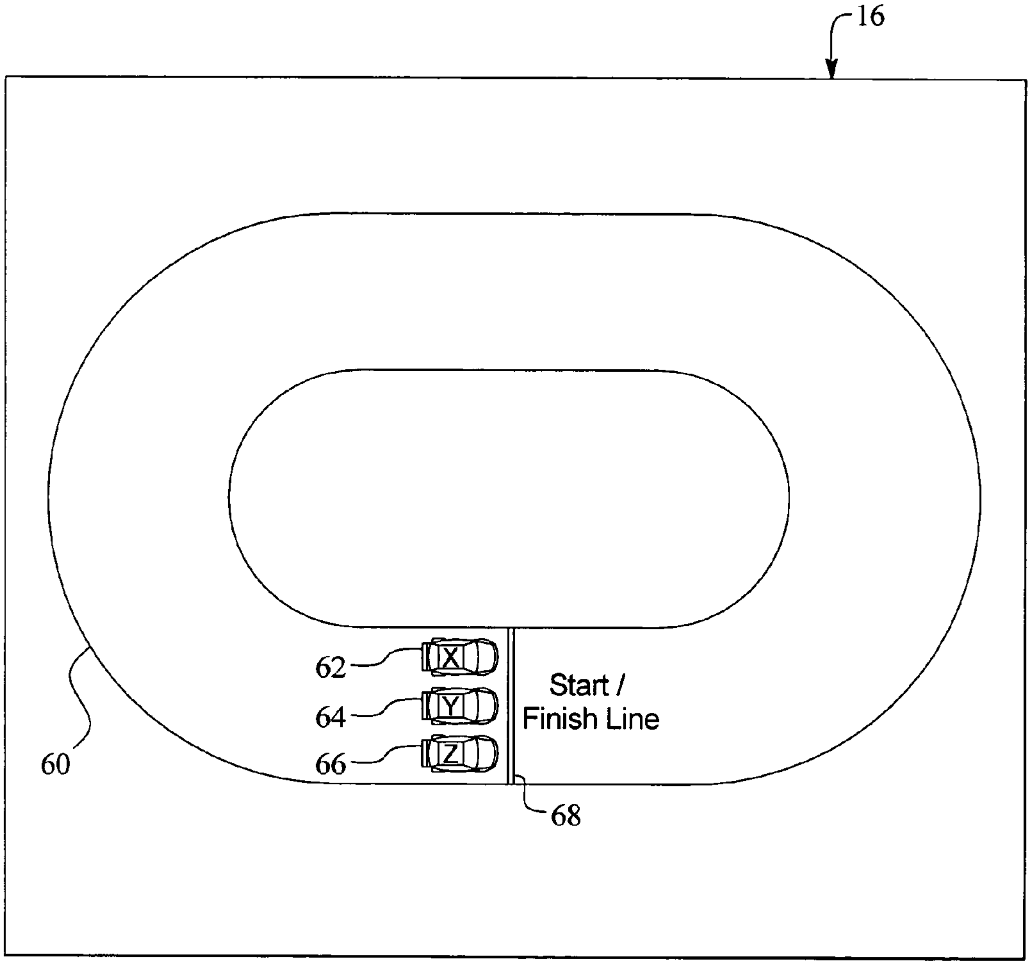
FIGS. 3A, 3B and 3C are front elevation views of a display of one embodiment of the present invention illustrating an example determination of an outcome in a first interactive game.

The interactive game requires player inputs as in a conventional arcade game, as generally illustrated in FIG. 3A. A player enters a designated wager on the wagering game and then the interactive game begins. The gaming device enables a player to use the wheel 31 and other inputs such as pedals (not shown) to maneuver a displayed car on or around the displayed race course in a conventional manner. This interactive game thus requires a plurality of inputs by the player. The object of the game is to achieve the highest place finish or to be the first car to cross a finish line 68 on the race course. The display device 16 displays three cars, Car X 62, Car Y 64 and Car Z 66 on the race course 60. In this embodiment, the player controls Car X 62, and the gaming device controls or operates Car Y 64 and Car Z 66. It should be appreciated that the race may include any suitable number of cars in this interactive game.

Figure 3B:
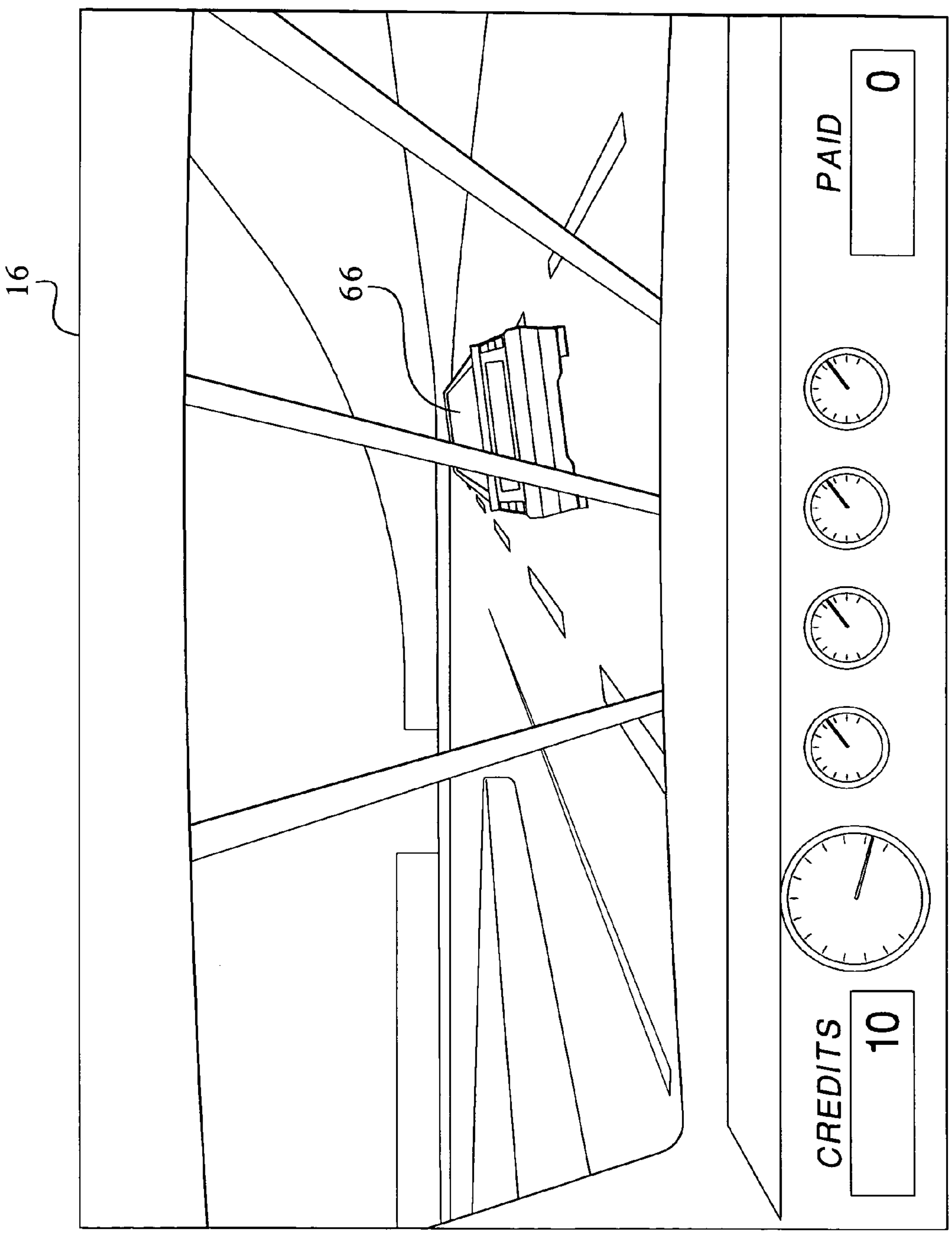
Figure 3C:
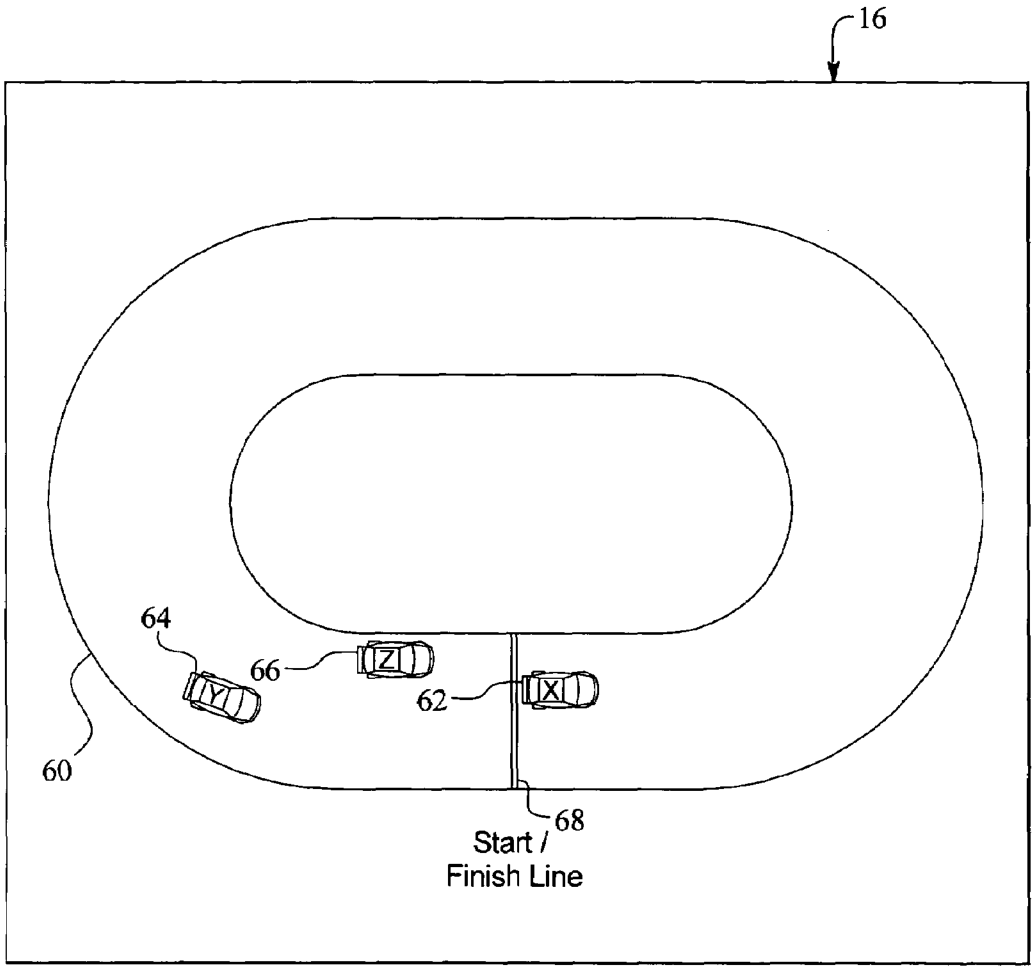

The player plays the racing game by using the wheel 31 to maneuver on the racetrack as illustrated in FIG. 3B. Each of the cars achieves a place, as illustrated in FIG. 3C. Car X 62, which the player controls, reaches the finish line first and therefore achieves first place. Car Z 66 finishes in second place, and Car Y 64 finishes in third place. The gaming device determines a function of the wagering game based on this outcome achieved by the player in this interactive game. In this example, the gaming device determines which of a plurality of different paytables to employ in a wagering game.

In this embodiment, the wagering game is a slot game which includes three different paytables as illustrated in FIGS. 3D, 3E and 3F. That is, there are different paytables for the same game or event. The gaming device includes Paytable A 70 as illustrated in FIG. 3D, Paytable B 72 as illustrated in FIG. 3E and Paytable C 74 as illustrated in FIG. 3F. Paytable A, Paytable B and Paytable C each have a different volatility and the same average expected payout. Paytable A 70 has the highest volatility, Paytable B has a medium volatility and Paytable C has the lowest volatility. The volatility pertains to the range of the values of the awards. For example, the lowest award of Paytable A is 5 for a generated symbol combination of three cherries. The highest award achievable when the gaming device employs Paytable A in the wagering game is 600 when the gaming device generates three 7's. Thus, the awards in Paytable A have a volatility range of 595 between the lowest possible award and the highest possible award. In this example, the winning combinations all have the same probability of being generated on the payline. Therefore, the average expected payout is 175 for each of the four wins. Paytable B has a volatility range of 300 (325−25) and an average expected payout for each of the four wins of 175 ((25+125+225+325)/4). Paytable C has a volatility range of 25 (185−165) and an average expected payout for each of the four wins of 175 ((165+170+180+185)/4). The average of the awards provided to a player is 175 regardless of the paytable employed. It should be appreciated that these averages do not factor in losing or non-winning outcomes. It should also be appreciated that each paytable has a different volatility and the same average expected payout or can have a substantially similar average expected payout. The average expected payout of the wagering game is thus the same or substantially the same regardless of which of the paytables the gaming device employs in the wagering game.

It should be appreciated that other methods of paytable generation, known, conventional or new, can be employed in accordance with the present invention to generate the same effect by having the same paytables but different probabilities of the outcomes. For instance, Paytable D may pay higher awards than Paytable E for all combinations, and a lower probability of occurrence for such combinations, which on average results in a same return percentage of the initial wager.

In this embodiment, each place or outcome in the interactive game is associated with or corresponds to one of the different paytables associated with the wagering game. The gaming device employs Paytable A 70 in the wagering game when a player achieves first place in the interactive game. The gaming device employs Paytable B 72 in the wagering game when a player achieves second place in the interactive game. The gaming device employs Paytable C 74 in the wagering game when a player achieves third place in the interactive game. The place or the game outcome the player achieves in the interactive game thus determines which paytable the gaming device employs in the wagering game. In this embodiment, a player has a chance of achieving a higher award in the wagering game if they achieve a better place or rank in the interactive game. It should be appreciated that ties, equal, or substantially equal outcomes in the interactive game could result in the employment of the same or similar paytables in the wagering game.

In this example, since the player achieved first place in the interactive game. The gaming device employs Paytable A in the second slot game.

Figure 3G:
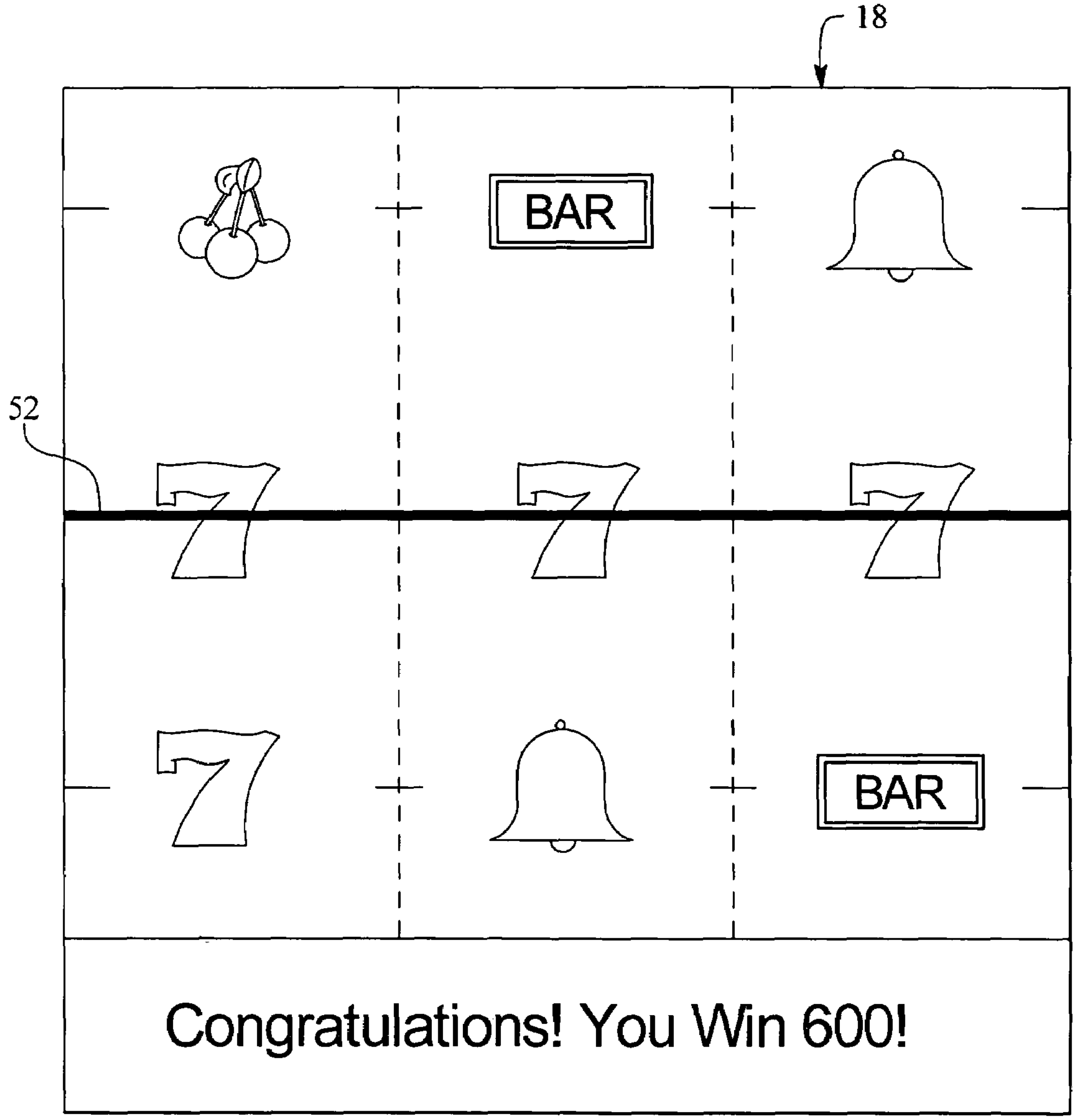
FIG. 3G is a front elevation view of a display of an example slot-type wagering game which employs the paytable of FIG. 3D to determine any award based on an outcome in the wagering game.

As illustrated in FIG. 3G, the gaming device displays a slot game on the display device 18. The reels automatically begin spinning or alternatively begin spinning upon a player input. The slot game generates the combination of 7 7 7 on the payline 52. The gaming device employs Paytable A in the slot game because the player achieved first place in the first racing game, and Paytable A is associated with the interactive game outcome of first place. The gaming device evaluates the symbols generated along the payline according to Paytable A. Therefore, the player wins an award of 600 monetary units, as illustrated in FIG. 3G. If the gaming device had generated three bars on the payline, the gaming device would have provided the player with the award of 10 monetary units according to Paytable A.

It should be appreciated that if the player achieved second place in the interactive game, the gaming device would have employed Paytable B. If the slot game generated the same symbol combination of 7 7 7, the gaming device would have provided the player with an award of 325 monetary units which is the award associated with the combination 7 7 7 for Paytable B.

It should thus be appreciated that in this embodiment each of the paytables has the same average expected payout. The gaming device on average pays out the same amount of money regardless of which paytable is employed in the wagering game. Thus, the element of skill employed in the interactive game or the outcome in the interactive game in actuality does not determine an award provided to a player but just determines the range of possible awards. The average expected award provided to the player is the same regardless of the interactive game outcome or paytable employed in the wagering game.

In one embodiment, the gaming device determines the eligibility for a jackpot award based on the outcome of an interactive game. For example, the gaming device includes two paytables associated with the wagering game. One of the paytables includes a jackpot award such as $1,000,000. The second paytable does not include the possibility of a jackpot award. The gaming device employs the paytable which includes the jackpot award in the wagering game if a player achieves a certain or designated outcome in the interactive game such as first place.

In one embodiment, the symbol combinations of each of the paytables have the same probabilities. In another embodiment, a plurality of the symbol combinations are each associated with a different probability of being generated. That is, the symbol combinations are weighted in a conventional manner on most slot machines.

In another embodiment, the gaming device or gaming system includes a plurality of wagering games. The interactive game outcome determines which wagering game to provide to the player. In the single player embodiment, the gaming device provides the player the wagering game associated with the outcome achieved in the interactive game. In the multi-player embodiment, the gaming system provides each player one of the wagering games associated with the individual outcome achieved by that player in that player's play of the interactive game. It should be appreciated that each of the players may be provided different wagering games. The gaming device provides a player an outcome in the wagering game, which can result in an award based on the paytable associated with that wagering game.

In one alternative embodiment, the gaming device includes a plurality of wagering games. The gaming device determines which wagering game to provide the player based, at least in part, on the outcome of the interactive game. For example, the gaming device includes a plurality of wagering games such as different slot games. If a player ranks first in the interactive game, the gaming device enables the player to play a first slot game as the wagering game. If a player ranks second in the interactive game, the gaming device enables the player to play a second slot game as the wagering game. If a player ranks third in the interactive game, the gaming device enables the player to play a third slot game as the wagering game. The gaming device provides the player with a result such as a loss or a win based on the outcome of the wagering game. Two or more or all of the slot games may be different in any suitable manner such as having different paytables, different awards and/or different symbol combination probabilities.

In another embodiment of the present invention, a gaming system or a gaming unit includes a central server or controller which includes a plurality of gaming machines. The gaming system includes at least one interactive game and at least one wagering game. The gaming system enables a plurality of players to play against each other in the interactive game. The gaming system provides each of the players with an outcome for the interactive game. In one embodiment, the outcome of the interactive game determines at least one function of the wagering game for each player of one of the linked gaming machines. In another embodiment, the gaming system includes a plurality of different types of wagering games. In this embodiment, the gaming system determines which wagering game from the plurality of different types of wagering games to provide to a player based on each of the outcomes in the interactive game.

Figure 4A:
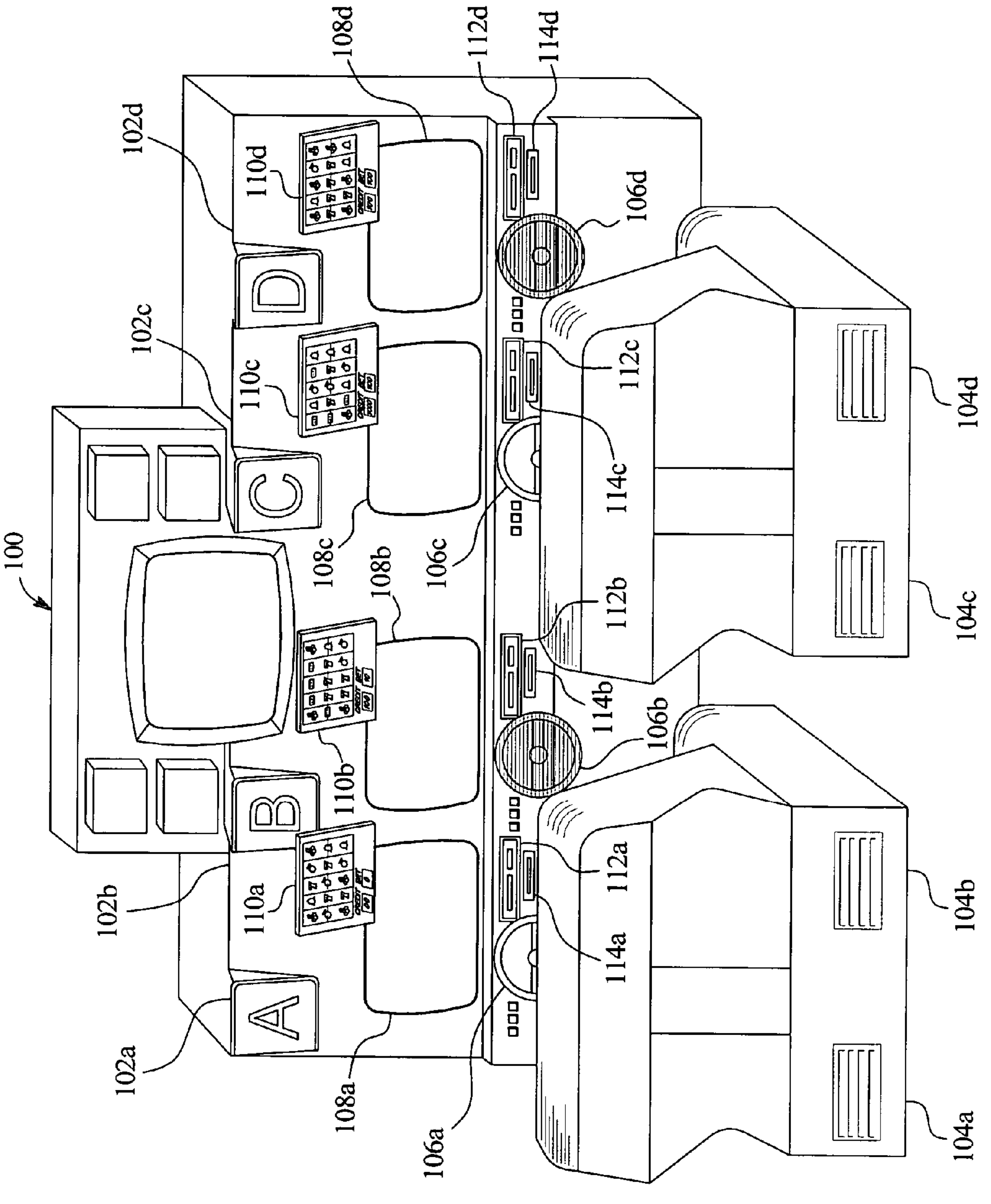
FIGS. 4A, 4B, 4C and 4D are perspective views of a gaming system of one alternative embodiment of the present invention that includes a plurality of gaming machines which enable multiple players to simultaneously play an interactive game in competition with each other to determine the outcome of the interactive game for each player.

Referring now to FIG. 4A, a gaming system or a gaming unit 100 includes a central server or controller 56 and a plurality of gaming machines or gaming devices 102*a*, 102*b*, 102*c* and 102*d*. It should be appreciated that the gaming system or unit may include any suitable number of gaming machines in communication with or linked to the central server or controller 56. These gaming machines may be referred to herein alternatively as the gaming machines, the gaming stations or the linked gaming machines. The gaming machines may be the same type or different types of gaming machines. The gaming machines have the same interactive game and the same wagering game. Alternatively, they may have different wagering games or different types of wagering games. For example, one gaming machine may be adapted to play a slot wagering game while another gaming machine may be adapted to play a poker wagering game. The play of each of the gaming machines 102*a* to 102*d* in the group is monitored by the central server 56. The central server or controller may be any suitable server or computing device which includes a processor and a memory or storage device. In alternative embodiments, the central server is a progressive controller or another gaming machine in the gaming system.

As illustrated in FIG. 4A, in one embodiment, each gaming machine or station includes a seat or a chair 104*a*, 104*b*, 104*c* and 104*d*, respectively, and a wheel 106*a*, 106*b*, 106*c* and 106*d*, respectively. It should be appreciated that the gaming machines may alternatively or additionally include any suitable type of input device, including but not limited to, joysticks, keyboards, buttons, guns and rollerballs. Each gaming station includes a first display device 108*a*, 108*b*, 108*c* and 108*d*, respectively, operable to display the same first racing interactive game in which each player participates. Each gaming station also includes a wager input 112*a*, 112*b*, 112*c* and 112*d*, respectively, to accept coins, tokens, dollars, tickets or other forms of payment. Each gaming station includes a monetary dispenser such as a ticket dispenser 114*a*, 114*b*, 114*c* and 114*d*, respectively. The outcome in the interactive game displayed by these display devices are the same for all of the players of the interactive game. Each gaming station includes a second display device 110*a*, 110*b*, 110*c* and 110*d*, respectively, operable to individually display separate wagering games. These wagering games are independent from one another and can provide different outcomes to the players which can result in different awards to the players.

It should be appreciated that in an alternative embodiment, the same wagering game is provided and displayed to the players with the same outcomes. Any awards provided to the players may be different because the paytables used to evaluate the awards may be different.

More specifically, in a multiple gaming machine embodiment, the same wagering game such as the same slot game can be provided to two or more or each player. The gaming machines would employ two or more different paytables for that wagering game for the players. The same outcome would be provided to all of the players of that wagering game. The award, if any, provided to each player would be based on the paytable for that wagering game associated with that player. For example, if the outcome is three bars, the first player may obtain an award of 60 monetary units for the three bars and the second player may obtain an award of 30 monetary units for the three bars based on the different paytables employed for the players. In another example, one wild symbol outcome could result in an award of 10 monetary units for one player and no monetary units (i.e., a loss) for another player based on the different paytables employed for the players. Thus, the same game display and outcome can be provided to two or more players which results in different awards or one or more awards and one or more losses.

In this embodiment, the gaming machines become active or go into an active state upon appropriate funding of or wagering on the wagering game of the gaming device, such as upon a designated minimum wager by a player. In one embodiment, each of the gaming machines requires a player to wager a minimum amount such as five dollars. In another embodiment, the gaming device enables a player to place a wager for the wagering game in a conventional slot or other wagering gaming device format. After the wager is made, the gaming device displays and initiates the interactive game. For example, where the interactive game is a racing game and the wagering game is a slot game, the gaming device displays the interactive game, the wagering games or both of the games to attract a potential player. The gaming device displays the second slot game to enable the player to place a wager in a conventional manner, such as by selecting the number of paylines and the amount bet per line. After the player finishes placing the wager, the gaming device automatically or upon a player input displays and/or initiates the first racing game.

Upon the activation of one of the gaming machines by the appropriate player input, the central controller informs each of the gaming machines to instruct potential players that an interactive game will begin soon. The gaming machines can produce audio-visual, audio, or visual information to inform potential players that a game will be initiated or started in a designated time period. This information informs other potential players if they would like to participate in the play of the interactive game, they will need to make the appropriate wagers on the wagering game.

Figure 4B:
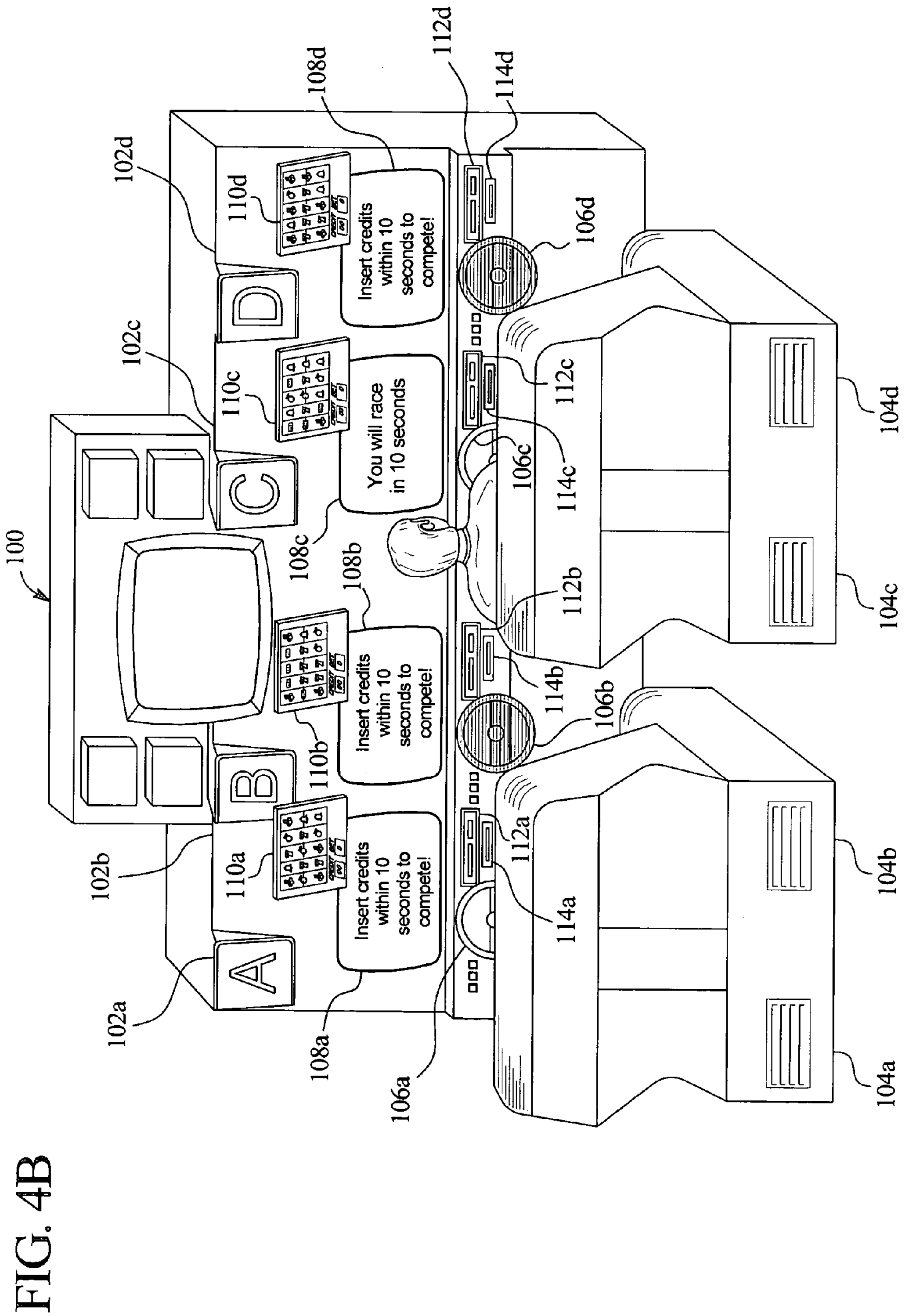

As illustrated in FIG. 4B, a player appropriately funds one of the gaming machines 102*c* by placing a wager on the wagering game. The central processor initiates a sequence displayed by each of the first display devices 108*a*, 108*b*, 108*c* and 108*d*, respectively. Each of the first display devices displays a count down from 10 to 0 enabling potential players time to place a wager and play the initiated interactive game on one of the unoccupied linked gaming machines. The central controller then determines which of the gaming machines are in an active state after the countdown sequence terminates. That is, the central controller determines which gaming machines will participate in the first interactive game which includes the multiple players who have placed the wager in the designated time period.

Figure 4C:
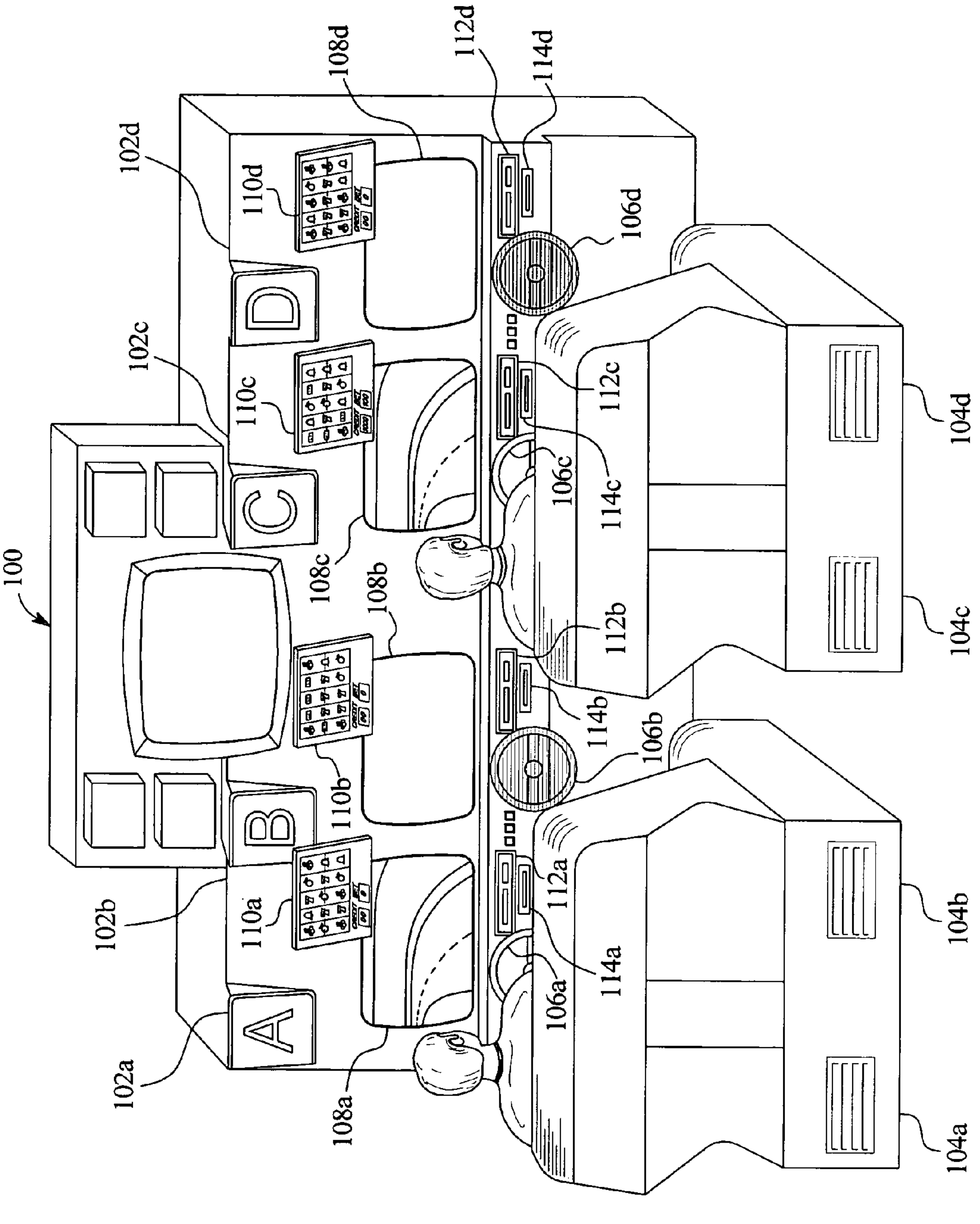

As illustrated in FIG. 4C, in this example, the players placed the designated wager on the first gaming machine 102*a* and the third gaming machine 102*c* by wagering the appropriate amount using the respective wager input devices 112*a* and 112*c*. In one embodiment, the upper displays 110*a* and 110*c* display the respective number of monetary units in each gaming machine. In one embodiment, the upper display device also displays the amount wagered by each player.

The central controller enables the two players to play the first racing game using wheels 106*a* and 106*c*, respectively, to control or maneuver on the racetrack in an attempt to achieve first place in the interactive game.

Figure 4D:
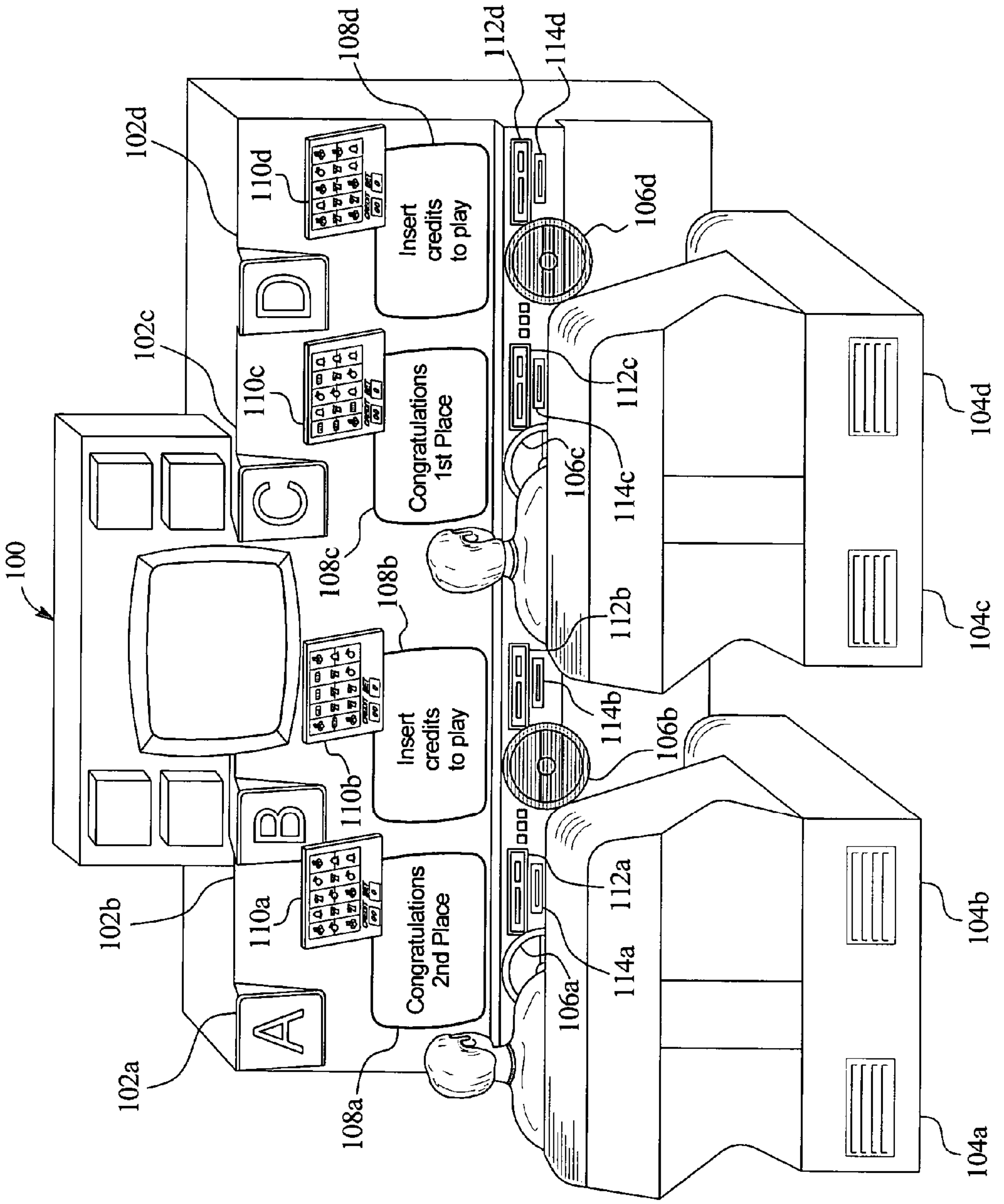

As illustrated in FIG. 4D, the player at Car C 102*c* achieves first place and the player at Car A 102*a* achieves second place. The lower display devices 108*a* and 108*c* indicate to the player the place or outcome achieved. Each of these outcomes determines which of a plurality of wagering games each active gaming machine provides to the player for a wagering game.

The gaming system includes a plurality of different wagering games in this example. As illustrated in 4E, each of the gaming stations is operable to enable a player to play slots, video poker, blackjack or keno. In one embodiment, as illustrated in the table 120 each of the outcomes of the interactive game is associated with a wagering game. For example, third place is associated with blackjack. When a player achieves third place in the interactive game, the gaming device they are playing on enables the player to play blackjack for the wagering game.

Figure 4F:
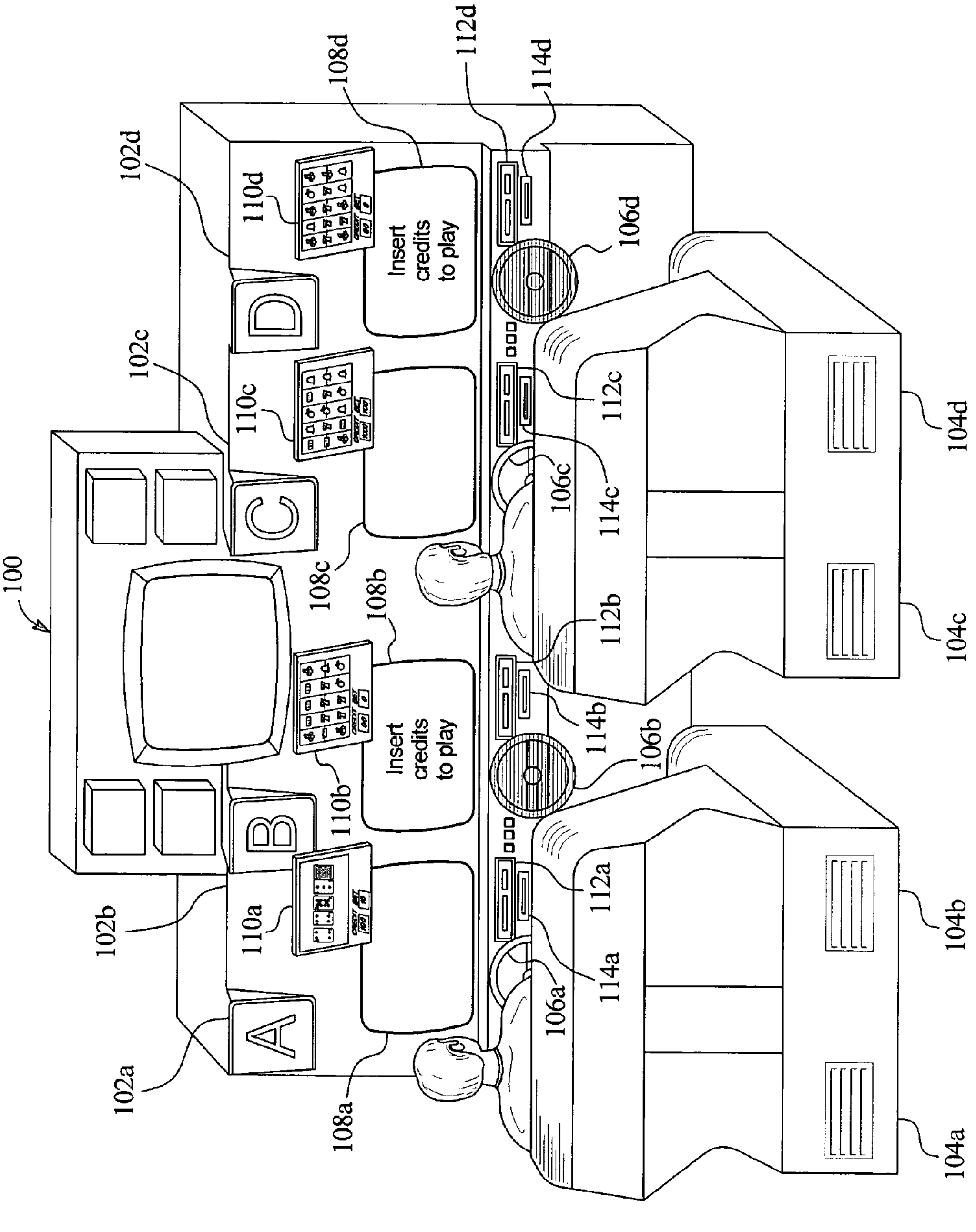
FIGS. 4F and 4G are perspective views of a gaming system of one alternative embodiment of the present invention that includes a plurality of gaming machines which enable multiple players to simultaneously and independently play wagering games which are determined based on the interactive game outcomes for the respective player, wherein each of the gaming machines provide a wagering game outcome which may result in an award for the player.

As illustrated in FIG. 4F, the player of Car A achieved second place, so the gaming machine 102*a* enables the player to play video poker on the upper display device 110*a*. The player of Car C achieved first place. Thus, the gaming machine 102*c* enables the player to play a slot game on the upper display device 110*c*. It should be appreciated that the wagering game may be any suitable random game.

Each of the wagering games begins automatically or upon a player input. Each of the active gaming devices 102*a* and 102*c* provides the determined wagering game on the respective upper displays 110*a* and 110*c*. In another embodiment, the gaming system provides the wagering game on the same display as the interactive game for each of the gaming machines. Each of the active gaming machines enables a player to play the determined wagering games independent of each other. The outcomes achieved in these wagering games are each independently randomly determined. Each of the active gaming machines provides each of the players with a wagering game outcome. If that wagering game outcome is a winning outcome for that game, the gaming machine provides the player an award.

Figure 4G:
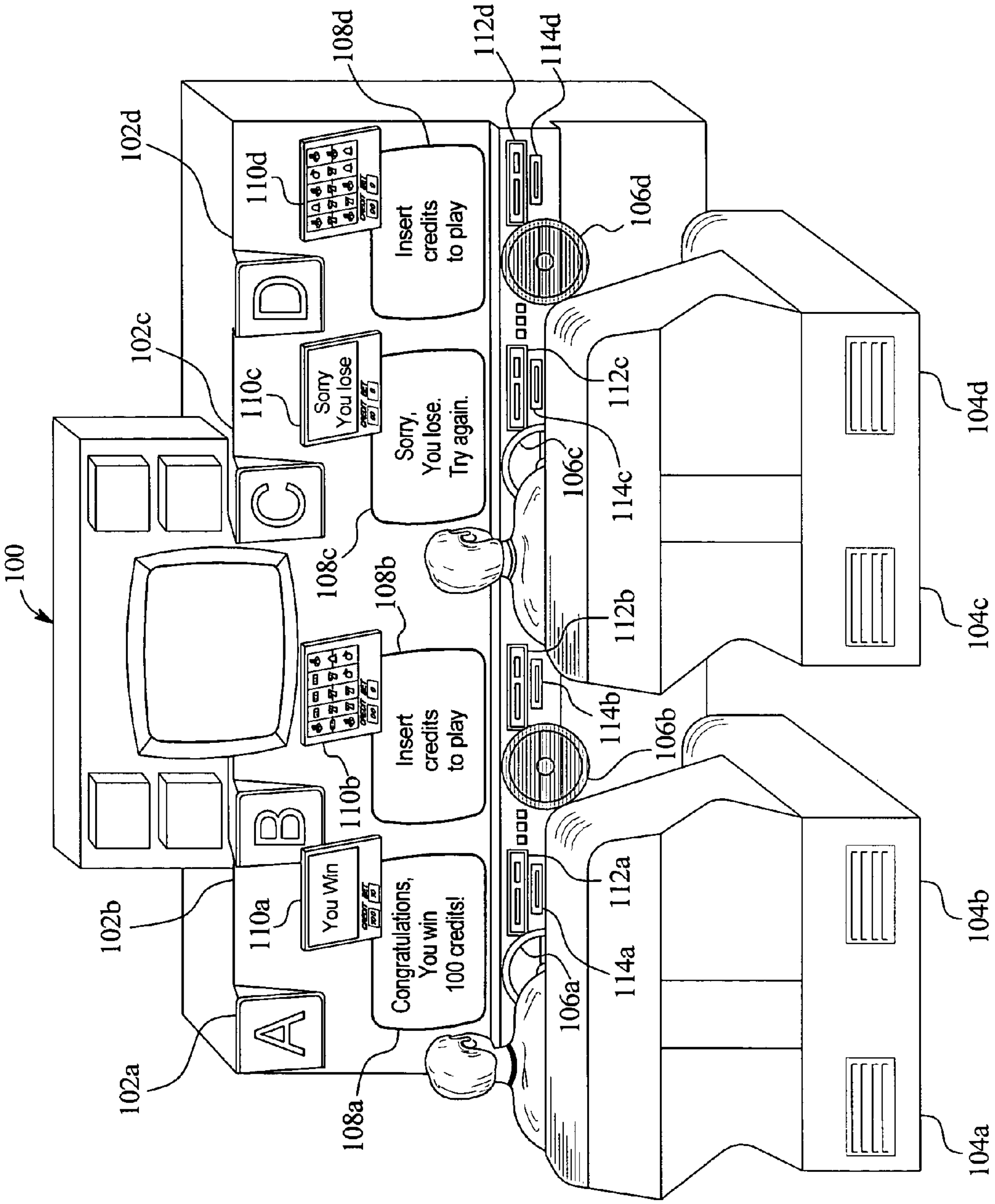

As illustrated in FIG. 4G, the player of Car A 102*a,* won 100 monetary units in the second video poker game. The lower display device 108*a* displays a message informing the player of the amount won, 100 monetary units. The upper display device 110*a* informs the player that he won. The player of Car C 102*c* did not win in the wagering game. That is, the second slot game provided to the player did not generate a winning outcome. The lower and upper display devices 108*c* and 110*c* inform the player that he did not win.

It should be appreciated that though the player of the third gaming machine 102*c* won the interactive game, this win did not result in an award provided to the player in the wagering game. The player of the first gaming machine 102*a* did not win the interactive game but won an award in the wagering game. Thus, the outcome of the first interactive game did not in actuality determine an award to be provided to the player. The outcome of the interactive game determined which wagering game the gaming system provided to each player. Thus, the element of skill in the interactive game did not put either player at an advantage or disadvantage for winning an award in the wagering game.

It should also be appreciated that the returns could be different if so desired by the game designer. In one such example embodiment, the higher-placed finisher has a better overall expected average return. For example, the average expected return may be 90% for the first place finisher, 94% for the second place finisher, and 92% for the third place finisher.

In the above multiple gaming machine embodiment, if after the countdown sequence ended the player at the third gaming machine was the only player (i.e., no other players entered the game by making the designated wager), then the player would play the game against the gaming machine as previously discussed for the single player embodiment of the present invention. The gaming device would provide the player with an outcome in the interactive game which would determine which of a plurality of wagering games the gaming device would provide to the player.

In another embodiment, the gaming system includes one wagering game and a plurality of paytables associated with the wagering game. In one embodiment, each of the paytables has a different volatility and the same average expected payout. The gaming system determines which paytable to employ in the wagering game of each gaming system based, at least in part, on the outcome in an interactive game. In one embodiment, at least one of the paytables has a different volatility than at least one of the other paytables. In this embodiment, the gaming system employs the paytable with the highest volatility in the wagering game of the player who achieves first place in the interactive game. In one embodiment, each of the other active gaming machines employ one of the paytables in the wagering games of the players with a lower place in the interactive game.

It should be appreciated that these sequential game gaming machines will take more time on average to play than a conventional gaming machine, such a slot machine or video poker. Therefore, it should be appreciated that the gaming machine may need to charge more per play or not return as much on average as other gaming machines, in order to have competitive earnings.

It should also be appreciated that the wagering game for each of the players of the multi-player embodiment may be the same game and have the same game result but that a plurality or each of the players may receive a different award. In one embodiment, two or more players have a different paytable for the wagering game. For example, the players each play the interactive game and achieve a game result or place in the interactive game. The wagering game such as a slot game is the same game for each player. The slot game is initiated on either individual display devices or on one large display device. The gaming system generates the same symbols in the slot game for each player. However, two or more of the players has a different paytable. The paytables may have different winning combinations or different awards or both. The players have the opportunity of achieving different awards from the same game result.

In another embodiment, the amount of the wager or monetary input influences one or more aspects or characteristics of one or both of the games. The amount of the wager may change any suitable aspect of either game. The amount of the wager may provide the player with a perceived or actual advantage in either game. That is, the wager amount may influence the odds of winning either the interactive game or the wagering game.

In one embodiment, wager amounts or ranges of possible wagers are associated with a length of time in either the interactive game or the wagering game. That is, in one example of this embodiment, a certain amount of a wager buys the player a certain amount of time to play the interactive game and the player can play the interactive game up until the allotted time limit. It should be appreciated that extra time could change the odds of winning in many interactive games. For example, in a point accumulation game such a shooting game, more time can give the player the chance to accrue more points. In another embodiment, the player can play as many interactive games as possible in the given amount of time. In another embodiment, a certain amount or level of a wager buys a player a certain amount of time for the wagering game and the player can win one or more awards in the wagering game. In another example of this embodiment, the player can play as many wagering games as possible during the fixed amount of time. It should be appreciated that in any of these embodiments, a relatively larger wager can increase the time allotment for either or both of the games.

In one embodiment, players that wager different or unequal amounts are able to compete against each other in a multi-player interactive game. That is, in one embodiment, the gaming system has a range of possible wagers, such as a minimum wager of $2 and a maximum wager of $25. The players place any wager in the range and compete against each other in the interactive game and then individually play the wagering game, regardless of the amount bet. The amount of the wager may affect any suitable aspect of the interactive game or the wagering game or both the interactive game and the wagering game.

In one example of this unequal wagering embodiment, the odds of winning either the interactive game and/or the wagering game can change based on the wagered amount.

For example, in one embodiment, if a player wagers a larger amount, the gaming machine produces a perceived advantage or an actual advantage in the interactive game. For example, if the skill game or interactive game is a racing game with a racing track or course, the player with the higher wager receives an advantage such as easier race course, more time to complete the course or a faster vehicle than one, more or all of the other players. This advantage can be a perceived advantage, that is, this advantage does not actually affect the outcome of the interactive game. This advantage can alternatively be a real advantage as well and thus increases the player's chances of winning.

The wager can change the odds of winning the wagering game in any suitable manner. The amount of the wager can result in a higher chance of winning the wagering game. For example, a higher wager can guarantee the player a paytable with more winning symbol combinations than a paytable provided for a lower wager.

In one example of this unequal wagering embodiment, the wager is used to determine an award amount in the wagering game. That is, if a player achieves a winning outcome in the wagering game, the player receives an award based on the wagered amount and an applicable paytable. If the player wagers a larger amount the player will achieve a higher award for a same winning outcome in the wagering game. It should be appreciated that the wager amount may also be used to determine an award amount in the interactive game as well.

In one example, Player A bets $1, Player B bets $2, Player C bets $4 and Player D bets $2. In one embodiment, Player C will have the highest odds of winning an award in the wagering game. That is, Player C has a higher percentage of winning the wagering game than any of the other players. In another embodiment, Player C receives a higher award if the Player C wins the wagering game. That is, if Player A and Player C both obtain the same winning game result in the wagering game, Player C will receive a higher award than Player A.

Additionally, the amount of the wager can affect one or more features of the wagering game. In one embodiment, a certain wager amount gives the player a chance to qualify for a bonus game. In another embodiment, a certain wager amount can provide the player with a multiplier that increases an award. The wager amount may either change the odds of winning the wagering game or increase an award for the wagering game or both.

It should be appreciated that the first skill game can be any suitable type of interactive game. The games can include skill events requiring dexterity, such as: (i) hitting a button at the right time; (ii) moving an object to the correct location; (iii) aiming an object properly; (iv) touching an input device with a correct amount of pressure or speed; (v) hitting an input device a correct amount of times; (vi) steering an object out of the way of oncoming objects or steering a moving object so that it does not hit objects in its path; or (vii) any combination of these.

The skill game can also include mental skill, such as: (i) remembering the location of an object or the content of an image; (ii) answering a trivia question correctly; (iii) making a proper logical deduction, for example, deciding an appropriate time to pull over for a pit-stop; (iv) making a proper or strategic decision, for example, keeping three of a kind in poker instead of attempting to draw a flush; (v) answering mathematical questions properly; or (v) any combination of these.

It should be appreciated that the interactive game outcome can be determined in any suitable manner. In one embodiment, the interactive game outcome is determined by a place or rank obtained in the interactive game. In another embodiment, the gaming device determines the interactive game outcome based on a point accumulation in the interactive game. In one example of this embodiment, the gaming device includes defined ranges that are associated with functions of the wagering game or types of wagering games. For example, in a golf game the total point accumulation in the interactive game determines which game is provided to player as a wagering game. If the player achieves a score under 65 strokes, the wagering game is slots. If the player achieves a score between 66 and 85 strokes, the wagering game is poker. If the player achieves a score over 100 strokes, the wagering game is keno. It should be appreciated that in this golf embodiment, the player may play alone, against another player, or against the computer but the second game is selected based on the player's total point accumulation. Therefore, in a multi-gaming machine embodiment, all of the players may have the same or different second games. In another embodiment, the interactive game outcome is based on a number of icons found in the game. In another embodiment, the interactive game outcome is determined based on a number of rounds played by a player or a number of levels obtained or achieved in the game. In another embodiment, the interactive game outcome is determined based on the number of objects eliminated in a game.

The wagering game may be any suitable game with a random outcome from a base or bonus game, such as, but not limited to, slot, poker, blackjack, roulette, bunco, keno, bingo, craps and any combination of these.

It should be appreciated that the gaming device, the gaming unit and the gaming stations of the present invention may provide appropriate audio, visual and/or audio-visual messages to the player to keep the player informed as to the status of the games. For instance, upon the occurrence of a successful outcome in a game, the gaming device could display a message that the player won the game and now is eligible to play the wagering game with a certain paytable. Alternatively, unsuccessful outcome messages can be provided to the player.

In one alternative embodiment, the play may be time based. In one embodiment, faster play may cause the gaming machine to provide a better paytable. This encourages players to play faster and improve at the interactive game.

It should be appreciated that the interactive game outcome can determine any suitable feature of the wagering game, such as but not limited to, the wagering game provided to player, a paytable, an average payback percentage, an eligibility for a bonus game, an eligibility for a multiplier, a progressive award, bonus credits or monetary units, a number of selections in a game, a number of tries in a game, a number of games, a number of paylines, an amount of a modifier such as a multiplier and/or a number of rounds in a game. It should be appreciated that the interactive game outcome may determine one or any suitable number of functions, features or characteristics for the wagering game. It should be appreciated that the secondary functions, characteristics or features of the wagering game determined by the interactive game outcome may be weighted. For example, if the interactive game outcome determines the paytable of the wagering game, certain paytables may be employed or determined more frequently than other paytables. It should also be appreciated that the outcomes on each paytable may also be weighted.

It should also be appreciated that in an alternative embodiment, the number of successful outcomes in one or more skill events of the interactive game could determine the wagering game or a paytable or other characteristic of the wagering game. In one such embodiment, the outcome in the interactive game is a number such as how many targets were hit. Such outcomes can be provided from several know conventional arcade and other skill games. The number of successes or failures is the outcome of the interactive game which determines the function of the wagering game.

It should also be appreciated that the present invention contemplates various combinations of skill and random determinations to achieve an outcome in the interactive game. In such embodiments, part of the first outcome is based on skill and part of the first outcome is based on one or more random determinations. In one example, the number of attempts such as shots at a target a player gets is based on random determination. The determination of whether each attempt or shot is successful is based on the skill of the player using the player input or inputs.

It should be appreciated that in the multiplayer embodiments, threshold ranges or levels may be employed to determine the wagering game or functions of the wagering game. Multiple players may thus get the same wagering game or same paytable for the wagering game. These multiple players may have different results because each wagering game is independently played (i.e., has an independent random generation of the outcome for that game).

In further alternative embodiments, multiple players may play the interactive game as a team and accumulate points or achieve an outcome together. In this embodiment, the interactive game outcome depends on the input of all of the players on that team. The gaming system determines and provides an interactive game outcome for each team. In one embodiment, these players obtain the same wagering game or paytable for the wagering game based on their rated outcome in the interactive game. In one embodiment, each of the teams plays the wagering game independently and each team member individually receives the same award for the wagering game. In another embodiment, each of the players plays the wagering game independently of all of the other players. It should be appreciated that the wagering game may award the members of the same team the same or different outcomes or awards for the wagering game.

In another embodiment, the gaming system includes a plurality of gaming devices or machines, as described above. The gaming machines include a first interactive game and a second wagering game. To participate in the games, the players are required to wager a certain amount. As illustrated in FIGS. 5, and 6, in one embodiment, a certain amount or percentage of the wager funds an award for the winner of the interactive game or the interactive game prize, a second amount or percentage is allocated for winnings from the paytable and a third amount is allocated for the house hold or the casino.

More specifically, in one example of this embodiment, as illustrated in FIG. 5, a player is required to wager a certain amount, such as $2 to initiate the gaming machine of this gaming system. As illustrated in the table 150 of FIG. 5, the gaming machine allocates a certain amount or certain percentage of the wager for different pools or paytables. In one embodiment, on average the gaming system allocates 10% of the wager for the interactive game pool, 80% of the wager to the winning outcomes of the paytable or the winning paytable outcomes and 10% of the wager for the house hold. That is, on average $0.20 funds an interactive game pool for the winner of the interactive game, $1.60 funds the winning outcomes of the paytable for the wagering game; and $0.20 funds the house, casino or company running the game.

After play of the interactive game, in the multi-player embodiment, each of the players receives an interactive game outcome and one of the players receives the interactive game winning outcome or a designated outcome based on the interactive game pool. That is, one of the players wins a certain amount or percentage of the interactive game pool. In this example, one of the players wins part or all of the amount that equates to 10% of the wagers placed for that game. It should be appreciated that the players could have the same paytable or a different paytables in the wagering game and play the same game or different games in the wagering game.

In one example of this embodiment, 100% of the interactive game prize pool is awarded to the winner of that game. For example, if there are three players playing a racing game with a wager of $2, each player would receive an interactive game outcome, such as first place and second place. The winner of the racing game would receive an interactive game winning outcome based on the interactive game pool. In one embodiment, the player of the interactive game winning outcome would receive $0.60 as illustrated in the table 150 of FIG. 5. That is, the winner of the interactive game is a guaranteed winner.

In one embodiment, the higher the wager and the higher the number of players, the higher the interactive game pool is and in this embodiment, the larger the prize is for the winner. For example, as illustrated in the table 160 of FIG. 6 illustrates the same wager amount but includes five players instead of three players. There are five players playing the multi-player embodiment and each player wagers $2. In one embodiment, the player of the interactive game wins the entire interactive game pool, or $1.

It should be appreciated that any suitable percentage or amount of the wager may fund the interactive game pool, the wagering game winning outcome paytable, and the house hold. It should also be appreciated that the interactive game pool may be awarded in any suitable manner. For example, in one embodiment, 100% of the game pool is awarded for each play of the game.

In another embodiment, the gaming system does not award the entire interactive game pool at the termination of an interactive game. In this embodiment, some or all of the interactive game pool is accumulated, saved or rolled over for the winner of a subsequent game. In one embodiment, the interactive game pool accumulates until one of the players of the interactive game reaches a game level or a threshold, such as a certain number of points. In another embodiment, the gaming system awards at least one player of each interactive game an award funded by the interactive game pool but accumulates the other part of the interactive game pool until a triggering event occurs, such a predefined game win, a length of time, a certain number of players playing the game or a certain amount in the interactive game pool. The gaming system then awards some or all of the saved or accumulated interactive game pool to a player of the interactive game upon one or more of the triggering events.

In another embodiment, the gaming system does not award some or any of the interactive game pool to a player of the interactive game based on the results of the interactive game. Rather, the gaming system awards some or all of the interactive game pool as a result of a second game. In one embodiment, the results of the interactive game change the odds of winning the second game or the ability to participate in the second game. For example, in one embodiment, the second game is a lottery game. In one embodiment, the gaming system awards each of the players a number of chances or a number of tickets for the lottery game based on the results of the interactive game. For example, the first place player of the interactive game wins 10 of 100 lottery tickets, the second place player of the interactive game wins 5 of 100 tickets and the third place winner wins 1 of 100 tickets. Thus, the odds of wining an award for the second game are determined by the interactive game outcomes. In one example of this embodiment, the tickets for the lottery are drawn until there is a lottery game winner. That is, for each interactive game, some or all of the interactive game pool will be awarded to a player. That is, if the first ticket drawn is a non-winner, then the lottery will continue until a winning ticket is picked. In another example, if in a certain number of draws a winner is not drawn, the interactive award pool is accumulated to the next lottery game draw. It should be appreciated that interactive game pool may continue being accumulated or rolled over any suitable number of times. It should be appreciated that the second game can be any suitable second game. It should also be appreciated that the award or awards of the interactive game pool can be awarded in any suitable manner.

In one embodiment, the interactive game pool is only awarded for a particular win or game result. For example, in one embodiment, the games are played over a data network such as the internet and the interactive game is a point accumulation game with many players. In one embodiment, the interactive game pool is only awarded to a player when the player reaches a certain point accumulation. In another embodiment, portions of the interactive game pool can be awarded for a certain point accumulation with a certain amount of the interactive game pool going to the winner of the game. That is, consolation or interim awards can be awarded to players from the interactive game pool, in addition to the prize awarded to the winner of the interactive game.

In another embodiment, the gaming machine or system enables the player to place a side wager for the interactive game pool. In one embodiment, the gaming system or device enables the player to place one wager for the interactive game and a separate wager for the wagering game or place a wager and designate a certain amount of the wager for the interactive game and a certain amount of the wager for the wagering game. The amount of the wager for the interactive game is allocated for the interactive game pool and the amount for the wagering game is allocated for the paytable pool or the wagering game pool and the house hold or house fund. This side wager or side bet embodiment may incorporate any of the features or embodiments described above. For example, 100% of the interactive game pool may be paid out to one of the players each game, every couple of games or based on point accumulations. In one embodiment, the side wager or side bet may have a designated bet amount, such as $0.50 and that amount is allocated for the interactive game pool. In one embodiment, the side wager is not mandatory and the player has the option of wagering on the interactive game.

In any of these wager allocation embodiments, the gaming system or device may require a minimum bet to qualify to win some or all of the interactive game pool. For example, in one embodiment, to play the game the minimum bet is $2. However, in one embodiment to quality for a certain payback percentage in the interactive game, the player must wager at least a certain minimum bet level, such as $5. If the player wagers $2 and wins the interactive game, the gaming system or gaming machine provides the player with a lesser percentage or amount of the interactive game pool. If the player places the $5 bet and wins the interactive game, the player wins higher or maximum amount of the interactive game pool.

In another embodiment, the gaming system or gaming machine provides an award to one or more players of the interactive game based on a tournament format. In one example of this embodiment, the tournament of the interactive game is separated into time intervals. In one embodiment, each player of a gaming machine or a player of a data network, has a player tracking card or another suitable type a player identifier. If that player has the highest outcome or point accumulation for the interactive game in a designated period of time, the gaming system or device provides that player of the game an award for being the winner for that time interval. For example, every half-hour the gaming system determines which player won the most points for that half-hour and provides the winner a notification on the player card to pick up the award or provides the internet player a message that they won the award and awards the player the funds electronically. This embodiment may be incorporated into any of the other embodiments of this disclosure. For example, a portion or percentage of every wager is allotted for an interactive game pool and every half-hour the gaming system provides a player with the highest winning outcome in the interactive game some or all of the interactive game pool. The gaming system then starts the time interval over and continues to award at least one player an award during each time interval. In one embodiment, the interval is not based on time but on a certain number of games played. For example, for every 1000 games played, the gaming system provides an award to the top winner of the interactive game for those 1000 games and then starts the game count over again.

In another embodiment, illustrated in FIGS. 7A, 7B, 7C, 7D, 7E, 7F, 7G, 7H and 7I, the gaming system includes a plurality of game rounds and each game round includes an interactive game and a wagering game. In one example of this embodiment, for each round, the gaming machine 202*a*, 202*b*, 202*c* and 202*d* provides the interactive game to a player and then the gaming machine 202*a*, 202*b*, 202*c* and 202*d* provides a wagering game to the player. The gaming machine then provides a next round of the games to the player. In one embodiment, a wager is required for each round of the game sequence. In one embodiment, the player opts-in to the next round of the game by placing an input to continue. The input may be to bet a certain amount or insert more money or tokens for the next round. In one embodiment, the player uses one or more controls of the interactive game to make the input to continue, such as a wheel or petal in the illustrated embodiment. In another embodiment, the winner of the interactive game for that round earns or is awarded a free entry into the subsequent round. That is, the player does not have to opt-in but plays the second round for free. It should be appreciated that the player may opt-in in any suitable manner. In another embodiment, the player is enabled to opt-out. That is, the player is automatically entered into the wagering game unless the player makes an input to not play in the next round. In one embodiment, the wagering game of the last round of the game sequence has a higher paytable or an increased award than the other rounds. This higher award in the last wagering round of the game encourages players to participate in all rounds of the game. In other embodiments, each subsequent round has a higher or better paytable (i.e., higher average expected awards or larger top awards).

Figure 7A:
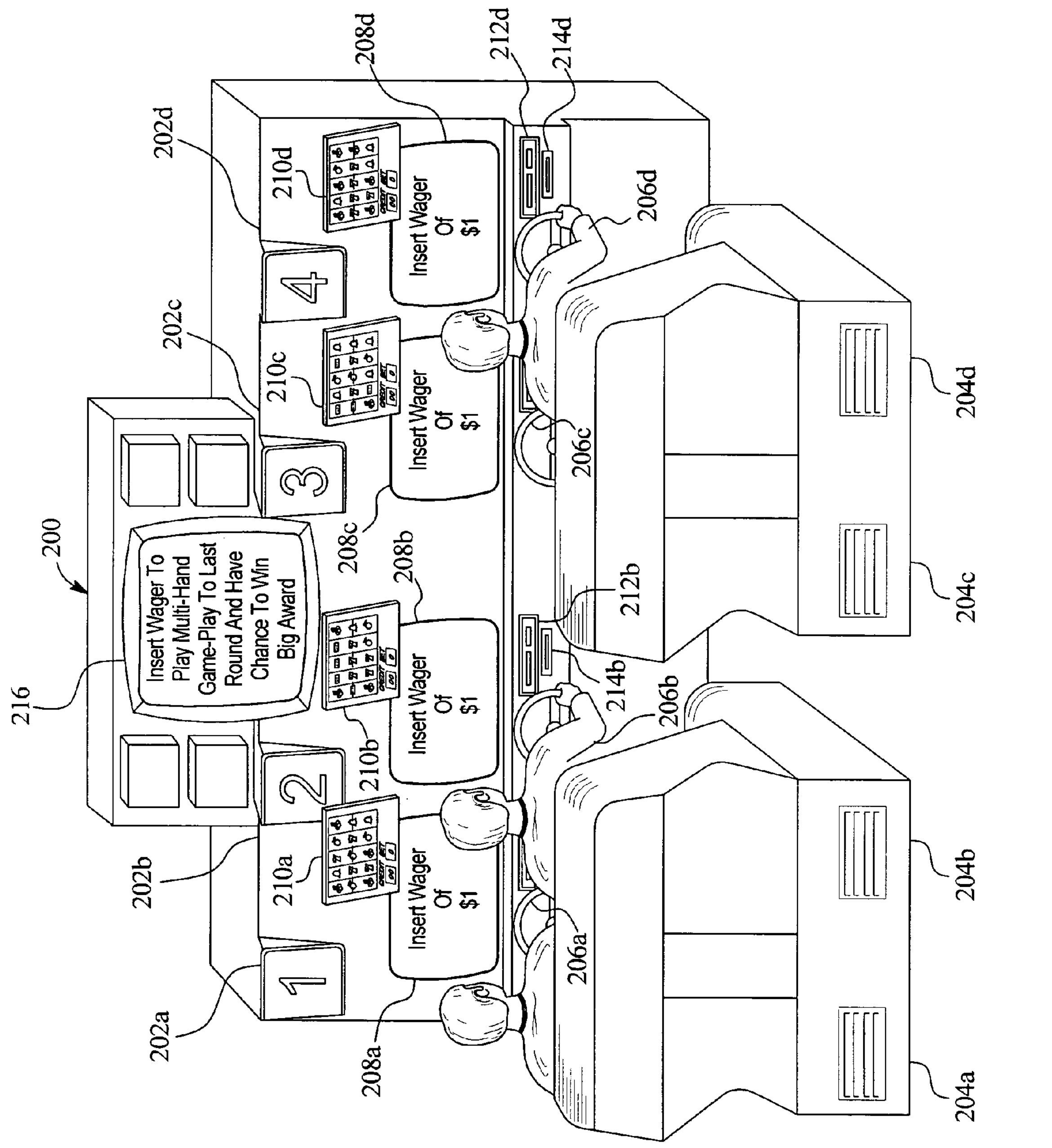
FIGS. 7A, 7B, 7C, 7D, 7E, 7F, 7G, 7H and 7I are perspective views of a gaming system of one embodiment of the present invention that includes a plurality of gaming machines which enable multiple players to simultaneously play a multi-round game where each round includes an interactive game and a wagering game.

As illustrated in FIGS. 7A, 7B, 7C, 7D, 7E, 7F, 7G, 7H, and 7I, in one embodiment, the interactive game requires player inputs as in a conventional arcade game, as generally illustrated in FIG. 7A. The interactive game is a racing game and the wagering game is a slot game. In one embodiment, the game includes three rounds. That is, the racing game includes 3 three rounds or laps around a track and for each round there is a wagering game. For each round, the player must wager $1 to play the round. After each round, each active gaming machine generates a slot game and provides an outcome to the player. The player then must make another wager to play the next round of the game.

As illustrated in FIG. 7A, the gaming system or gaming machines instruct the players to insert the minimum wager of $1 to play the first round of the game. In this embodiment, players of the first 204*a,* the second 204*b* and the fourth 204*d* gaming machines insert at least the required wager of $1.

Figure 7B:
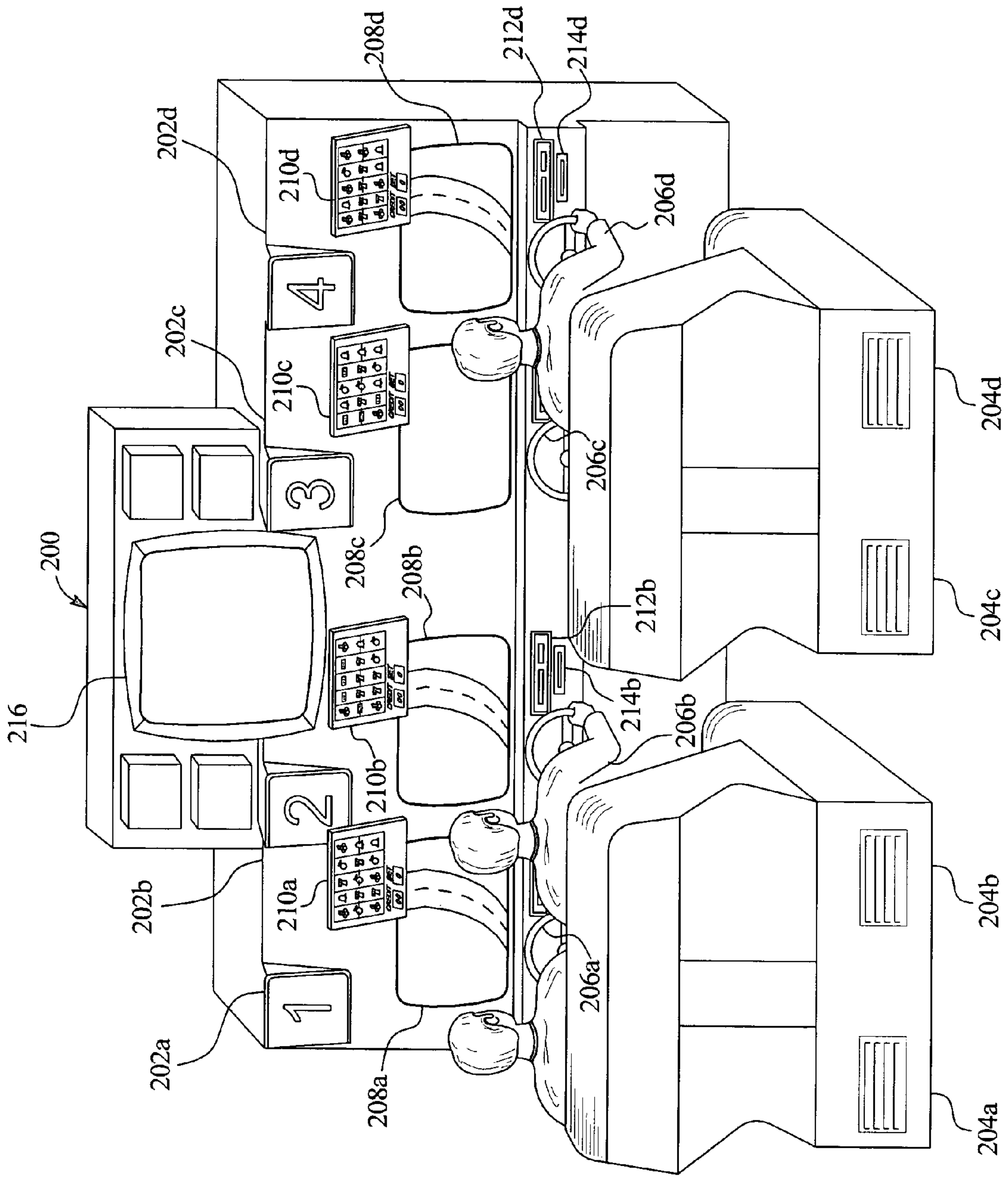

As illustrated in FIG. 7B, each of the activated gaming machines initiates the racing game on the primary display device 208*a,* 208*b* and 208*d,* respectively. The gaming machines enable the players to use the wheels and other inputs, such as pedals, to maneuver a displayed car on or around the displayed race course in a conventional manner. That is, each player inputs directions to steer around the race course.

Figure 7C:
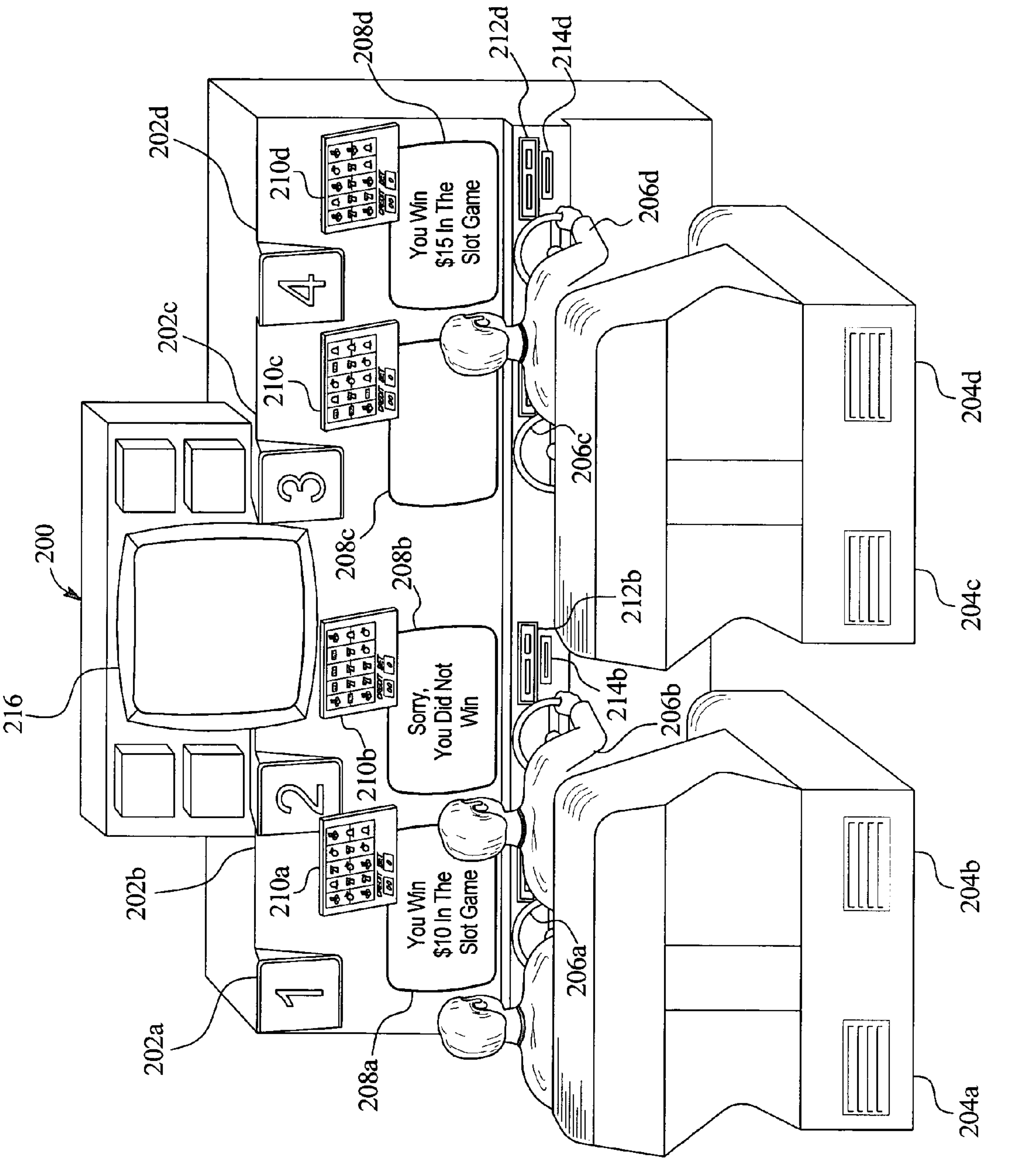

In one embodiment, as illustrated in FIG. 7C, after the first round, each of the active gaming machines 204*a,* 204*b* and 204*d* generate the outcome of a slot game on the secondary display device 210*a,* 210*b,* and 210*d.* The gaming machines communicate the outcome of the slot game to the players on the primary display device 208*a,* 208*b,* and 208*d.* The player of the first gaming machine 204*a* won $10. The player of the second gaming machine 204*b* did not win, and the player of the fourth gaming machine 204*d* won $15.

Figure 7D:
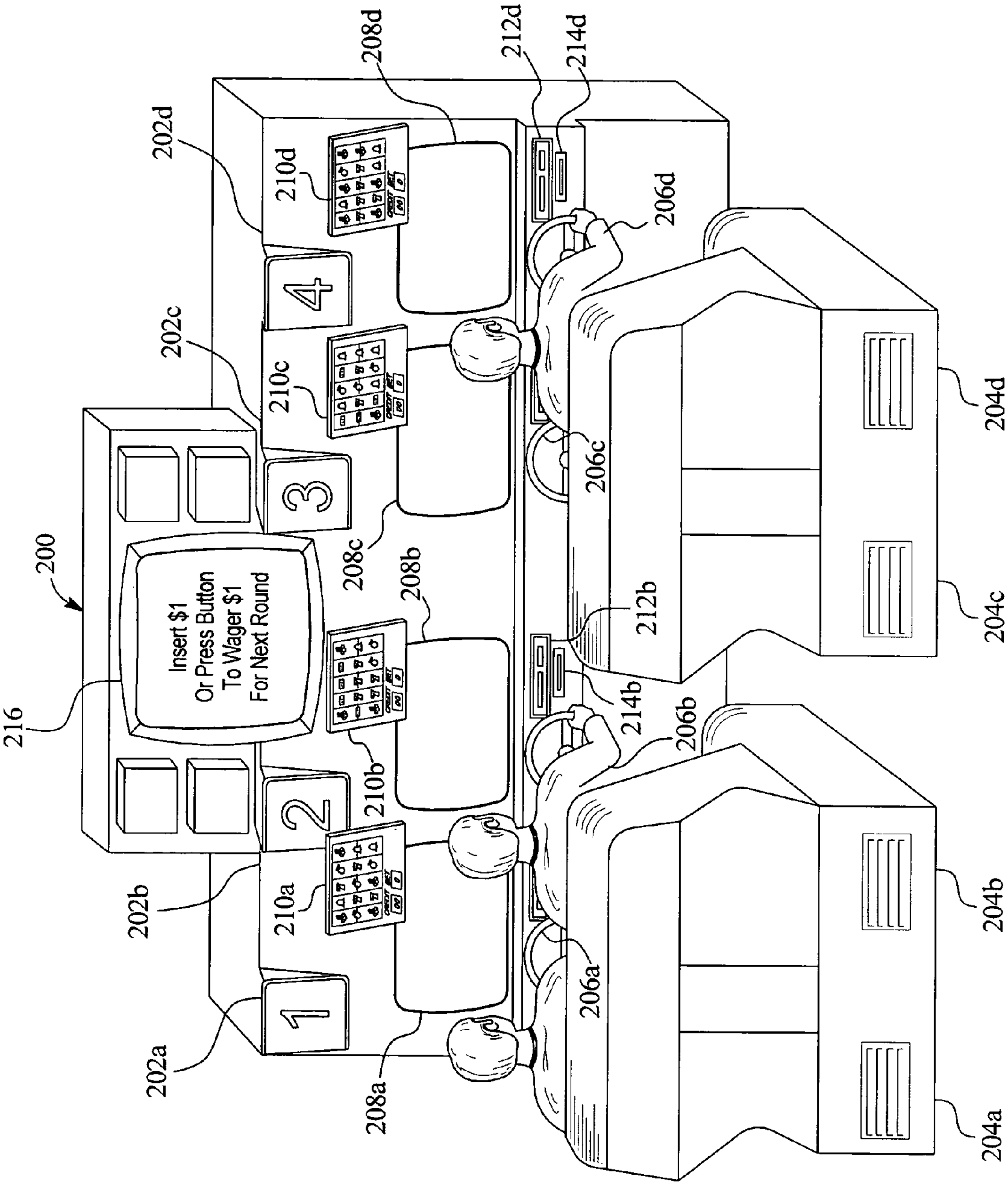

In one embodiment, the player has to make another wager to continue in the game, as illustrated in FIG. 7D. As illustrated, the central display 216 informs the players to insert $1 or make an input to wager a $1 to continue to the next round of the game. It should be appreciated that the gaming system may communicate the additional wager requirement to the players in any suitable manner or on any suitable display device.

Figure 7E:
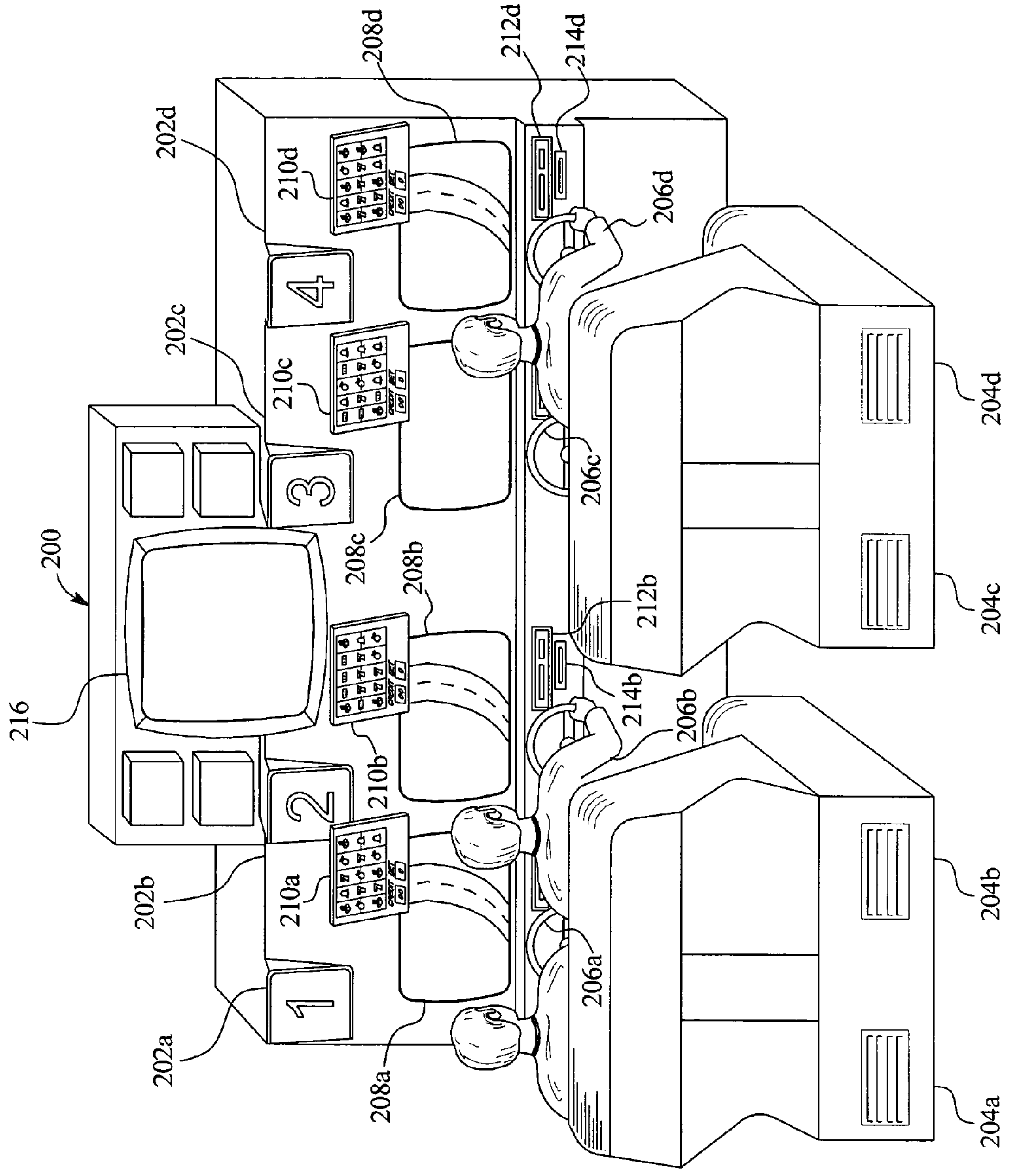
Figure 7F:
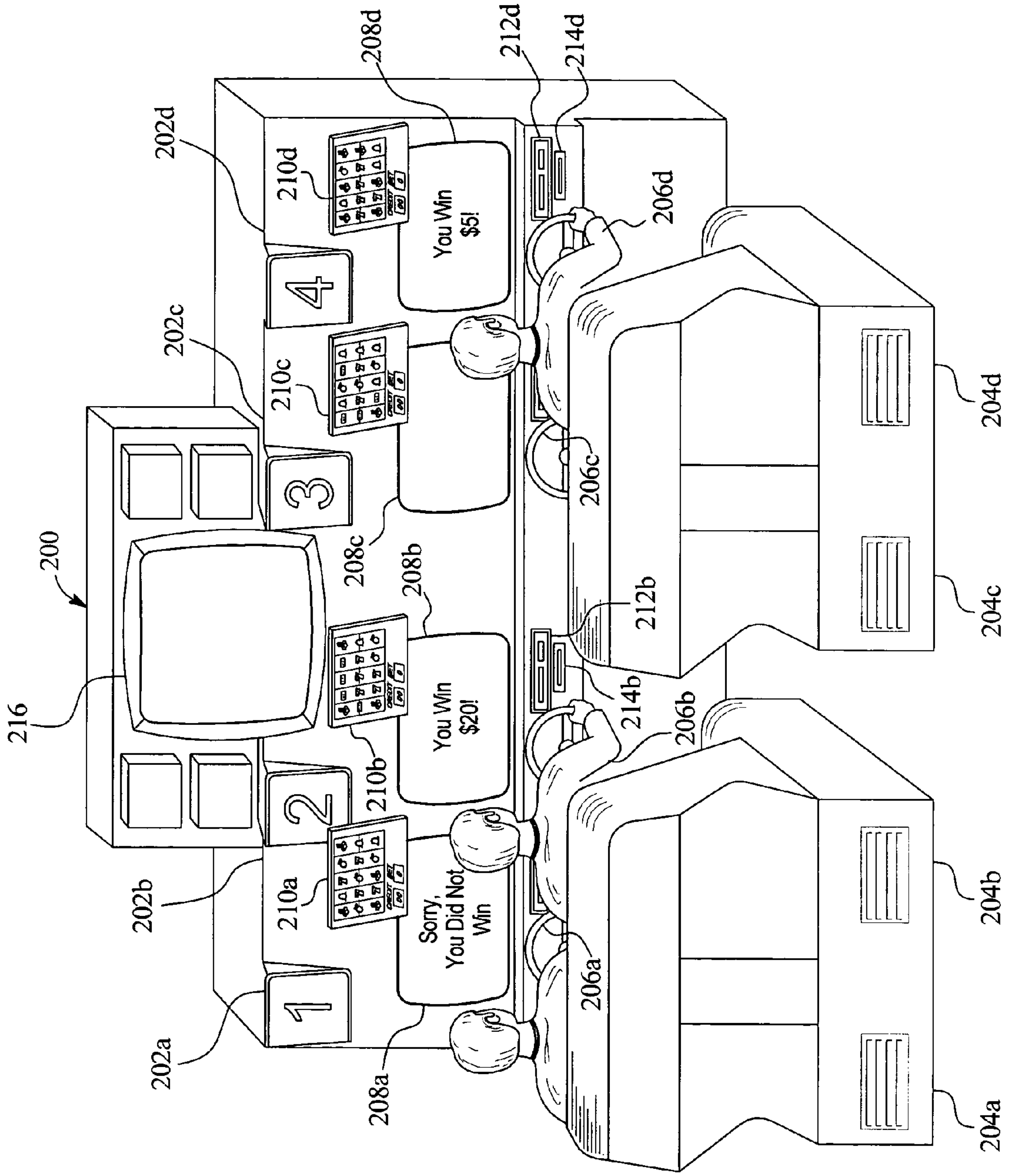

As illustrated in FIG. 7E, each of the players of the gaming machines 204*a,* 204*b* and 204*d,* inserted the next wager and are playing the interactive racing game on the primary displays 208*a,* 208*b,* and 208*d.* After the second round, the secondary display devices 208*a,* 208*b,* and 208*d* of each of the gaming machines generates symbols in a slot game, as illustrated in FIG. 7F. The outcome is communicated to each player on the primary display devices 208*a,* 280*b* and 208*d.* The player of the first gaming machine 204*a* did not win 208*a,* the second player of the second gaming machine 204*b* won $20 208*b* and the player of the fourth gaming machine 204*d* won $5 208*d.*

Figure 7G:
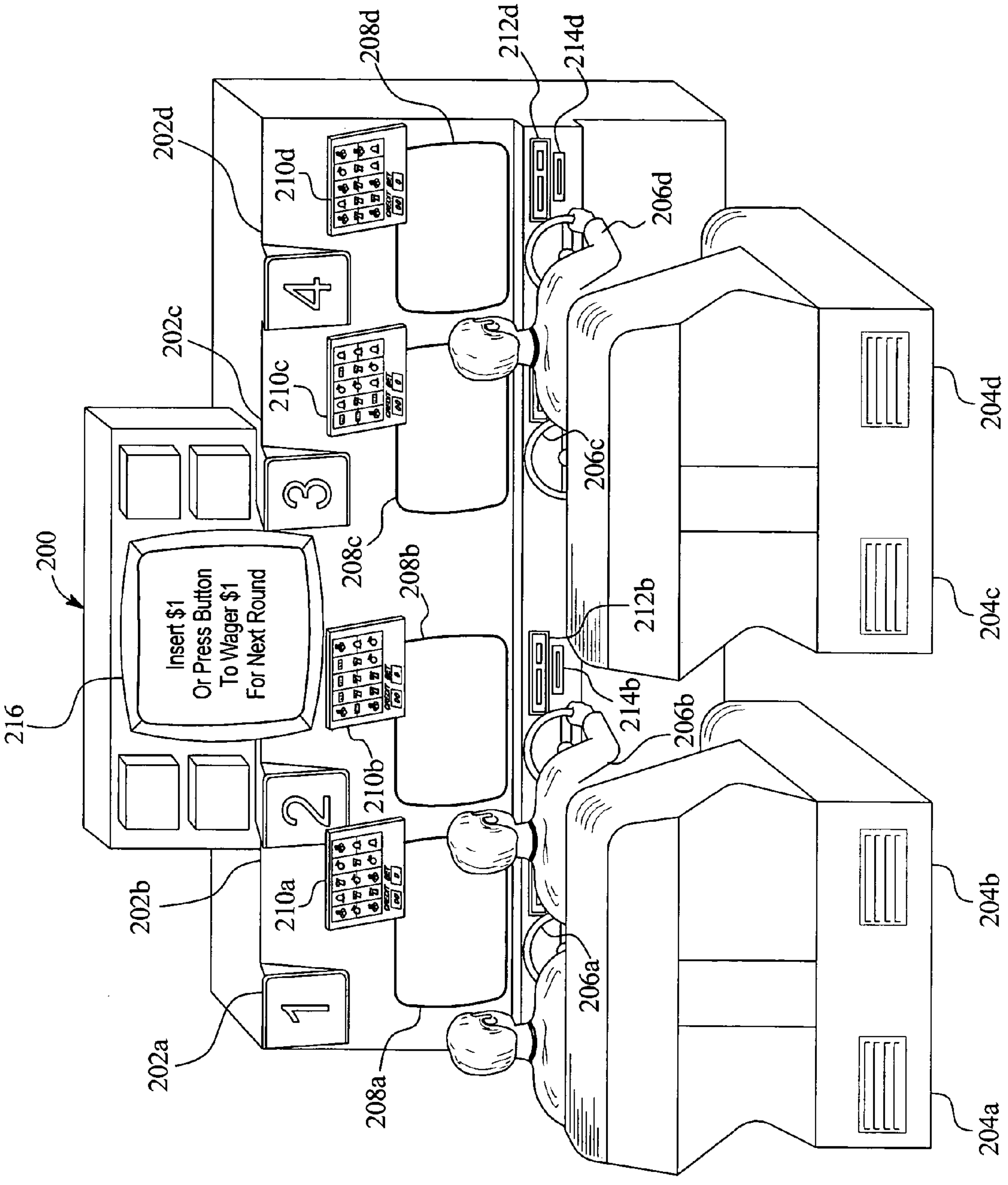

As illustrated in FIG. 7G, the central display device 216 instructs the players of the gaming machines to insert $1 to wager to play another round of the game.

Figure 7H:
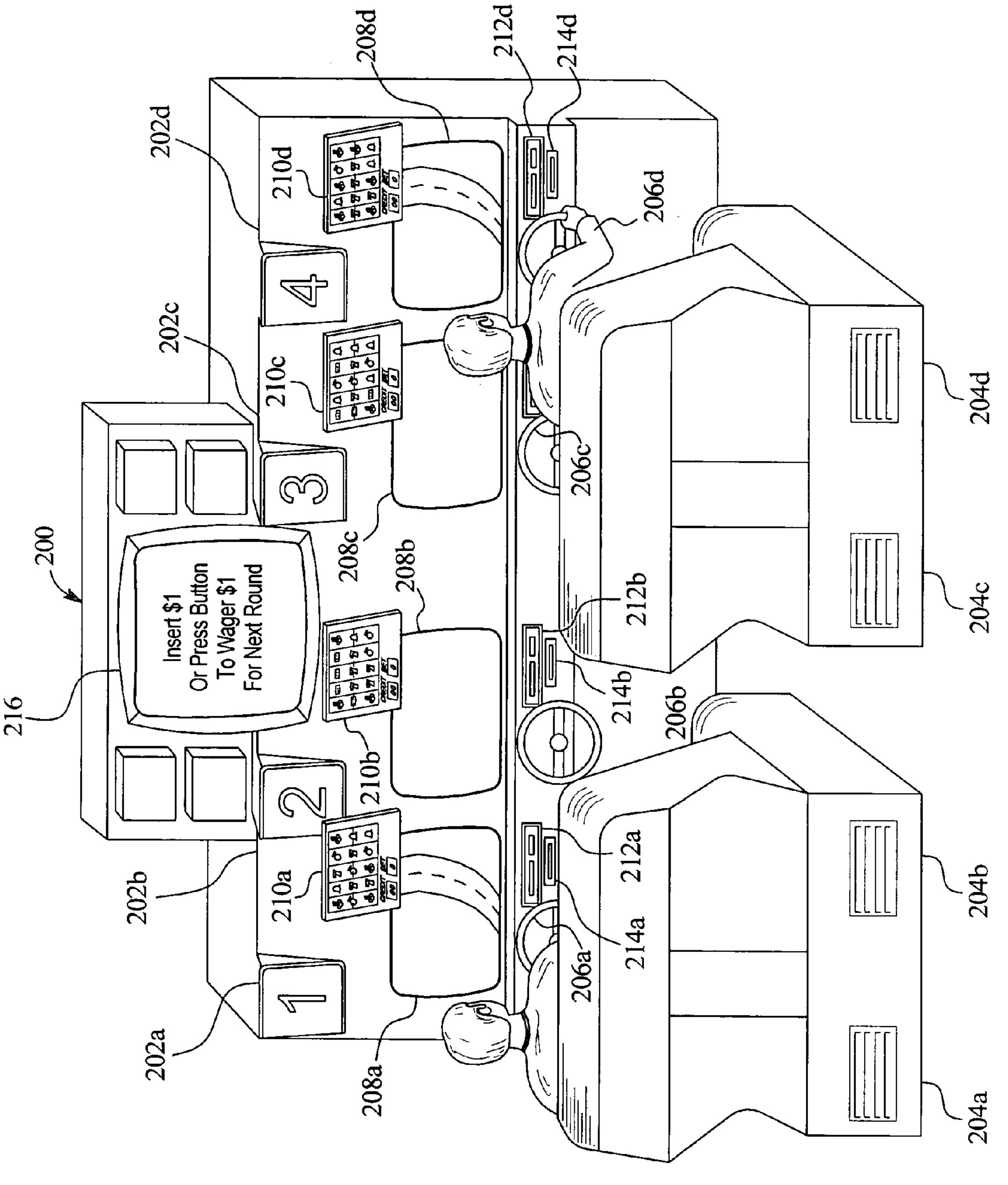

As illustrated in FIG. 7H, the player of the second gaming machine 204*b,* did not opt-in for the last round of the game. Therefore, the player of the second gaming machine does not get to participate in the last round of the game where the player has the chance to win a greater award or prize. The primary display devices 208*a* and 208*d* of the first game machine 204*a* and the fourth gaming machine 204*d,* display the last round of the racing game. The gaming machines enable the players to make inputs to maneuver around the race track.

Figure 7I:
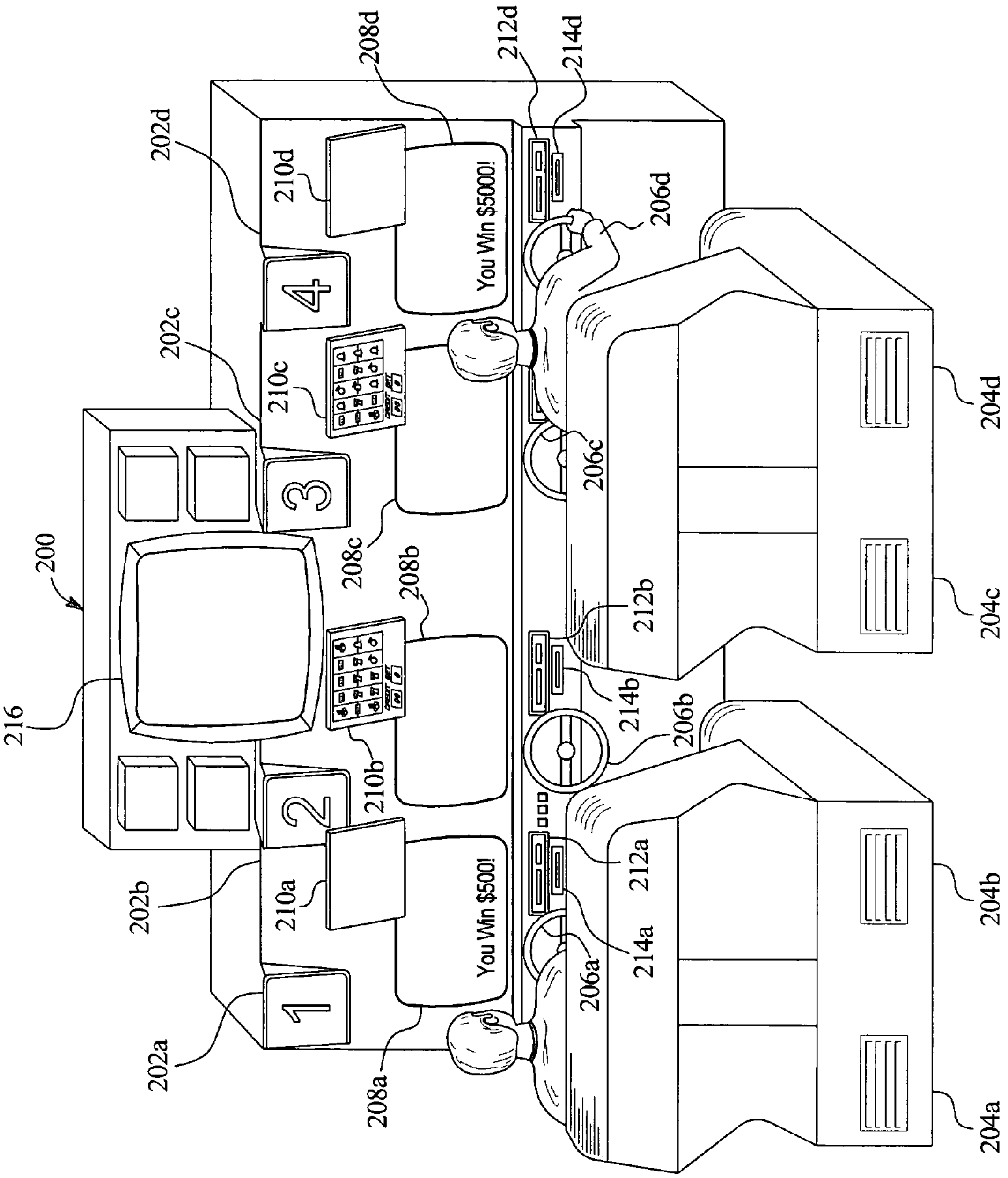

As illustrated in FIG. 7I, after the third course, the first 204*a* and the fourth 204*d* gaming machines generate a slot game on the primary display devices 208*a,* 108*d* respectively. The gaming machines generate an award for the players based on the outcome. The player of the first gaming machine 204*a* won $500. The player of the last gaming machine 204*d* won $5000. The game ends, because the last round is over and the players are enabled to play again.

It should be appreciated that the interactive game and the wagering game may be any suitable games. The game may have any suitable number of rounds. In one embodiment, each of the rounds of the games is limited to certain time intervals. For example, every 10 seconds a new round begins. In one embodiment, the wagering game is played simultaneously with the interactive game for each round. That is, while the player is playing the interactive game, the gaming machine generates an outcome in the wagering game.

In one embodiment, as described above, each of the players has to opt-in for the next round of the game. Each of the players must wager another amount to be eligible to play the next round of the game or game sequence. In another embodiment, each of the players must enter a large enough wager to be eligible to play all of the rounds of the game, such as $3. The players then must opt-out of the next round of the game to not play the next round. That is, the player must make an input that they do not want to play the next round of the game or they automatically play the next round of the game. Any suitable input device or control device can be used by the players to opt-in or opt out of the game. In one embodiment, the winner of the interactive game is enabled to play the next round for free. In another embodiment, any winnings from the wagering game are used to continue the game. That is, if the player receives an award in the wagering game, those winnings are used to place the wager for the next round. In one example of this embodiment, the player must then opt-out of the next round to stop playing. In either the opt-in or opt-out embodiments the game, any suitable queuing method may be employed to enable the players to opt-in and opt-out of the game, such as countdowns of time or verbal warnings.

In one embodiment, additional players may join open gaming machines at the beginning of any round of the game. That is, if a gaming machine is open, the player may make a wager and join in the game. In another embodiment, a player may only join the game at the beginning of the game. In another embodiment, players may play open gaming machines to begin their own game session. That is, if a gaming system includes five gaming machines and two people are playing in one game sequence, one, two or three more players may place a wager at the open gaming machines and play a game or game sequence against other newly joined players or against the machine.

In one embodiment, the final round of the wagering game includes an extra incentive to the player to play all of the rounds of the game. The incentive may be an extra wagering game, a better paytable, a multiplier, a chance for a bonus game, a chance for a progressive jackpot, a chance for a free game, or any other suitable incentive to play all of the rounds of the game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of operating a gaming system, including a plurality of gaming machines, wherein each of the gaming machines is in an active state upon a wager by a player on said gaming machine, said method comprising:

(a) enabling one or more players to place a wager;

(b) determining which gaming machines are in an active state;

(c) enabling the player of each active gaming machine to play the interactive game;

(d) determining and displaying an interactive game outcome from a plurality of different interactive game outcomes for the interactive game for each active gaming machine;

(e) determining, for each active gaming machine, a paytable from a plurality of different paytables to employ in a same play of a wagering game, wherein said determination is based, at least in part, on the displayed interactive game outcomes;

(f) for said same play of the wagering game for all of said active gaming machines;

(i) displaying the play of the wagering game to each of the players of each active gaming machine;

(ii) determining a same wagering game outcome for each active gaming machine;

(iii) causing each active gaming machine to display said same wagering game outcome; and (iv) determining any award to provide to the players of each active gaming machine, wherein said determination is based on the paytable for said gaming machine and based on said same wagering game outcome, wherein awards for the players of the active gaming machines can be different for said play of the game; and (g) providing any determined awards to the players of the active gaming machines.

2. The method of claim 1, which includes funding an interactive game pool with a portion of the wagers and providing the player of the gaming machine with an interactive game designated outcome an interactive game award based on the interactive game pool.

3. The method of claim 2, wherein the portion of the wagers that funds the interactive game pool is a predetermined percentage of each of the wagers.

4. The method of claim 2, wherein the portion of the wagers that funds the interactive game pool is a predetermined amount of each of the wagers.

5. The method of claim 1, wherein the interactive game is a competition game.

6. The method of claim 1, which includes basing the interactive game outcomes on one of the group consisting of: point accumulations, lengths of time and a predefined event.

7. The method of claim 1, wherein at least two of the paytables have different volatilities.

8. The method of claim 1, wherein at least two of the paytables have a same or substantially a same average expected payout and said paytables have different volatilities.

9. The method claim 1, which is provided to the player through a data network.

10. The method of claim 9, wherein the data network is an internet.

11. A gaming system comprising:

a plurality of gaming machines, wherein each of the gaming machines is in an active state upon a wager by a player on said gaming machine;

a plurality of different interactive game outcomes for an interactive game;

a controller in communication with each of said gaming machines, wherein the controller is operable with the gaming machines to:

(a) enable each of one or more players to place a wager;

(b) determine which gaming machines are in an active state;

(c) enable the player of each active gaming machine to play the interactive game;

(d) determine and display one of the interactive game outcomes for each active gaming machine;

(e) determine, for each active gaming machine, a paytable from a plurality of different paytables to employ in a same play of a wagering game, wherein said determination is based, at least in part, on the displayed interactive game outcomes;

(f) for said same play of the wagering game for all of said active gaming machines:

(i) display the play of the wagering game to the player of each active gaming machine;

(ii) determine a same wagering game outcome for each active gaming machine;

(iii) cause each active gaming machine to display said same award; and (iv) determine any award to provide to the players of each active gaming machine, wherein said determination is based on the paytable for said gaming machine and based on said same wagering game outcome, wherein awards for the players of the active gaming machines can be different for said play of the game;

(g) provide any determined awards to the players.

12. The gaming system of claim 11, wherein the controller is operable with the gaming machines to fund an interactive game pool with a portion of the wagers and provide the player of the gaming machine with an interactive game designated outcome an interactive game award based on the interactive game pool.

13. The gaming system of claim 12, wherein the portion of the wagers to fund the interactive game pool is a predetermined percentage of each of the wagers.

14. The gaming system of claim 12, wherein the portion of the wagers to fund the interactive game pool is a predetermined amount of each of the wagers.

15. The gaming system of claim 11, wherein the interactive game is a competition game.

16. The gaming system of claim 11, wherein the interactive game outcomes on one of the group consisting of: point accumulations, lengths of time and a predefined event.

17. The gaming system of claim 11, wherein at least two of the paytables have different volatilities.

18. The gaming system of claim 11, wherein at least two of the paytables have a same or substantially a same average expected payout.

19. A method of operating a gaming system, said method comprising:

(a) enabling one or more players to each place a wager;

(b) funding an interactive game pool with a portion of the wagers;

(c) enabling the players who placed wagers to play an interactive game;

(d) determining and displaying interactive game outcomes from a plurality of different interactive game outcomes for said play of the interactive game, said displayed interactive game outcomes including an interactive game designated outcome, wherein the interactive game designated outcome is obtained by one of the players who placed the wagers;

(e) providing the player who obtained the interactive game designated outcome an interactive game award based on the interactive game pool;

(f) for each player who placed the wager, determining a paytable from a plurality of different paytables to employ in a same play of a wagering game, wherein said determination is based, at least in part, on the displayed interactive game outcomes;

(g) for said play of the wagering game for each of said players:

(i) displaying the play of the wagering game;

(ii) determining a same wagering game outcome for each of the players for said wagering game;

(iii) displaying said same wagering game outcome to said players; and (iv) determining any award for each of said players, wherein said determination is based on the paytable for said player and based on said same wagering game outcome, wherein awards for the players can be different for said play of the game; and (h) providing any determined awards to the player.

20. The method of claim 19, wherein the interactive game award is equal or substantially equal to the total of the interactive game pool.

21. The method of claim 19, wherein the portion of the wagers that fund the interactive game pool is a predetermined percentage of each of the wagers.

22. The method of claim 19, wherein the portion of the wagers that fund the interactive game pool is a predetermined amount of each of the wagers.

23. The method of claim 19, wherein the interactive game is a competition game.

24. The method of claim 19, which includes basing the interactive game outcomes on one of the group consisting of: point accumulations, lengths of time and a predefined event.

25. The method of claim 19, wherein at least two of the paytables have different volatilities.

26. The method of claim 19, wherein at least two of the paytables have a same or substantially a same average expected payout and said paytables have different volatilities.

27. The method claim 19, which is provided to the players through a data network.

28. The method of claim 27, wherein the data network is an internet.

29. A gaming system comprising:

a plurality of gaming machines;

a plurality of different interactive game outcomes for an interactive game, wherein the interactive game outcomes include an interactive game designated outcome; and a controller in communication with each of said gaming machines, wherein the controller is operable with the gaming machines to:

(a) enable one or more players to each place a wager;

(b) fund an interactive game pool with a portion of the placed wagers;

(c) enable the players who placed wagers to play the interactive game;

(d) determine and display interactive game outcomes for said play of the interactive game, wherein the interactive game designated outcome is obtained by one of the players who placed the wagers;

(e) provide the player who obtained the interactive game designated outcome an interactive game award based on the interactive game pool;

(f) for each player who placed the wager, determine a paytable from a plurality of different paytables to employ in a same play of a wagering game, wherein said determination is based, at least in part, on the displayed interactive game outcomes;

(g) for said play of said wagering game for each of the players:

(i) display the play of the wagering game;

(ii) determine a same wagering game outcome for said wagering game;

(iii) cause a display of said same wagering game outcome to said players; and (iv) determine any award to provide for each player, wherein said determination is based on the paytable for said player and based on said same wagering game outcome, wherein awards for the players can be different for said play of the game; and (h) provide any determined awards to the players.

30. The gaming system of claim 29, wherein interactive game award is equal or substantially equal to the total of the interactive game pool.

31. The gaming system of claim 29, wherein the portion of the wagers to fund the interactive game pool is a predetermined percentage of each of the wagers.

32. The gaming system of claim 29, wherein the portion of the wagers to fund the interactive game pool is a predetermined amount of each of the wagers.

33. The gaming system of claim 29, wherein the interactive game is a competition game.

34. The gaming system of claim 29, wherein the interactive game outcomes are based on one of the group consisting of: point accumulations, lengths of time and a predefined event.

35. The gaming system of claim 29, wherein at least two of the paytables have different volatilities.

36. The gaming system of claim 29, wherein at least two of the paytables have a same or substantially a same average expected payout.

* * * * *

UNITED STATES PATENT AND TRADEMARK OFFICE

CERTIFICATE OF CORRECTION

PATENT NO. : 7,326,115 B2
APPLICATION NO. : 11/207659
DATED : February 5, 2008
INVENTOR(S) : Anthony J. Baerlocher It is certified that error appears in the above-identified patent and that said Letters Patent is hereby corrected as shown below:

IN THE CLAIMS:

In Claim 1, column 35, line 25, change "machines;" to --machines:--.

Signed and Sealed this

Second Day of September, 2008

JON W. DUDAS
*Director of the United States Patent and Trademark Office*